US011474236B2

(12) United States Patent
Katayama et al.

(10) Patent No.: US 11,474,236 B2
(45) Date of Patent: Oct. 18, 2022

(54) RADAR IMAGE PROCESSING DEVICE AND RADAR IMAGE PROCESSING METHOD

(71) Applicant: Mitsubishi Electric Corporation, Tokyo (JP)

(72) Inventors: Yumiko Katayama, Tokyo (JP); Kei Suwa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 17/015,853

(22) Filed: Sep. 9, 2020

(65) Prior Publication Data

US 2020/0408902 A1 Dec. 31, 2020

Related U.S. Application Data

(63) Continuation of application No. PCT/JP2019/014008, filed on Mar. 29, 2019.

(30) Foreign Application Priority Data

Mar. 30, 2018 (WO) .................. PCT/JP2018/013795

(51) Int. Cl.
*G01S 13/90* (2006.01)
*G06T 7/00* (2017.01)
*G06T 7/70* (2017.01)

(52) U.S. Cl.
CPC ...... *G01S 13/9027* (2019.05); *G01S 13/9023* (2013.01); *G06T 7/70* (2017.01);
(Continued)

(58) Field of Classification Search
CPC ............ G01S 13/9027; G01S 13/9023; G01S 13/9058; G06T 7/97; G06T 2207/10044;
(Continued)

(56) References Cited

U.S. PATENT DOCUMENTS

| 4,720,679 A | 1/1988 | Patrick et al. |
| 6,011,505 A | 1/2000 | Poehler et al. |
| 2018/0011187 A1* | 1/2018 | Katayama ........... G01S 13/9023 |

FOREIGN PATENT DOCUMENTS

| JP | 2007-322383 A | 12/2007 |
| JP | 2010-281584 A | 12/2010 |

(Continued)

OTHER PUBLICATIONS

D. L. Bickel, "A null-steering viewpoint of interferometric SAR", IGARSS 2000 IEEE, Jul. 2000, pp. 3206-3209.
(Continued)

*Primary Examiner* — Bernarr E Gregory
*Assistant Examiner* — Yonghong Li
(74) *Attorney, Agent, or Firm* — Birch, Stewart, Kolasch & Birch, LLP

(57) ABSTRACT

A radar image processing device includes a phase difference calculating unit calculating a phase difference between phases with respect to a first and a second radio wave receiving points in each pixel at corresponding pixel positions among pixels in a first and a second suppression ranges, the first and the second suppression ranges being suppression ranges in a first and a second radar images capturing an observation area from the first and the second radio wave receiving points, respectively; and a rotation amount calculating unit calculating each phase rotation amount in the pixels in the second suppression range from each phase difference, wherein a difference calculating unit rotates phases in the pixels in the second suppression range based on the rotation amounts, and calculates a difference between pixel values at corresponding pixel position among the pixels in the first suppression range and phase-rotated pixels in the second suppression range.

5 Claims, 14 Drawing Sheets

(52) U.S. Cl.
CPC ...... *G06T 7/97* (2017.01); *G06T 2207/10044* (2013.01); *G06T 2207/20212* (2013.01)

(58) Field of Classification Search
CPC ............. G06T 2207/20212; G06T 7/70; G06T 2207/10; G06T 2207/20
See application file for complete search history.

(56) References Cited

FOREIGN PATENT DOCUMENTS

| WO | WO 2015/151134 A1 | 10/2015 |
|----|-------------------|---------|
| WO | WO 2016/125206 A1 | 8/2016  |

OTHER PUBLICATIONS

International Search Report, issued in PCT/JP2018/013795, PCT/ISA/210, dated Jun. 26, 2018.
International Search Report, issued in PCT/JP2018/036184, PCT/ISA/210, dated Dec. 25, 2018.
International Search Report, issued in PCT/JP2019/014008, PCT/ISA/210, dated Jun. 25, 2019.
Xiang et al., "A new DEM reconstruction method based on an accurate flattening algorithm in interferometric SAR", 2008 IEEE International Conference on Acostics, Speech and Signal Processing, 2008, pp. 1093-1096.
Extended European Search Report dated Jul. 14, 2021 in corresponding European Patent Application No. 18 913 118.8.
Rossi Cristian et al. "High-Resolution InSAR Building Layovers Detection and Exploitation", IEEE Transactions on Geoscience and Remote Sensing, vol. 53, No. 12, Dec. 1, 2015 pp. 6457-6468.
Extended European Search Report dated Mar. 23, 2021 in corresponding European Patent Application No. 19 776 654.6.
U.S. Office Action dated Apr. 21, 2022 for related U.S. Appl. No. 17/015,836.

* cited by examiner

RADAR IMAGE PROCESSING DEVICE AND RADAR IMAGE PROCESSING METHOD

CROSS-REFERENCE TO RELATED APPLICATION

This application is a Continuation of PCT International Application No. PCT/JP2019/014008 filed on Mar. 29, 2019, which claims priority under 35 U.S.C. § 119(a) to Patent Application No. PCT/JP2018/013795 filed in Japan on Mar. 30, 2018, all of which are hereby expressly incorporated by reference into the present application.

TECHNICAL FIELD

The present invention relates to a radar image processing device and a radar image processing method for calculating differences between pixels included in a first radar image and pixels obtained by phase rotation included in a second radar image.

BACKGROUND ART

A tall building or the like may appear as a scatterer in a radar image acquired by a radar device.

The distance from a platform on which the radar device is mounted to a high position of the scatterer is shorter than that from the platform to a low position of the scatterer by the height of the scatterer.

When the distance from a platform to a high position of a scatterer is shorter than that to a low position of the scatterer, layover, which is a phenomenon that a signal reflected at the high position of the scatterer is displaced toward the platform, occurs.

When layover occurs, a signal reflected at a high position of a scatterer is displaced and thus overlaps with another reflected signal present at the position to which the reflected signal is displaced, which may result in presence of a plurality of reflected signals in one pixel in a radar image.

Non-patent Literature 1 mentioned below teaches a radar image processing device that calculates a difference between a pixel included in a first radar image and a pixel included in a second radar image.

By calculating the difference, the radar image processing device can suppress a reflected signal with a phase difference between the phase with respect to a first radio wave receiving point and the phase with respect to a second radio wave receiving point being zero among a plurality of reflected signals present in one pixel.

The first radio wave receiving point refers to the position of a platform when a first radar image is taken, and the second radio wave receiving point refers to the position of the platform when a second radar image is taken.

CITATION LIST

Non-Patent Literature

Non-patent Literature 1: D. L. Bickel, "A null-steering viewpoint of interferometric SAR," IGARSS2000

SUMMARY OF INVENTION

Technical Problem

The radar image processing device of the related art can suppress a reflected signal with a phase difference between the phase with respect to a first radio wave receiving point and the phase with respect to a second radio wave receiving point being zero among a plurality of reflected signals present in one pixel.

As for a reflected signal, however, that is scattered at the same height as the position where a reflected signal that can be suppressed is scattered among a plurality of reflected signals present in one pixel the phase difference between the phase with respect to a first radio wave receiving point and the phase with respect to a second radio wave receiving point is not zero.

There has thus been a problem in that a reflected signal with a phase difference between the phase with respect to a first radio wave receiving point and the phase with respect to a second radio wave receiving point not being zero cannot be suppressed.

The present invention has been made to solve such problems as described above, and an object thereof is to provide a radar image processing device and a radar image processing method capable of also suppressing a reflected signal with a phase difference between the phase with respect to a first radio wave receiving point and the phase with respect to a second radio wave receiving point not being zero.

Solution to Problem

A radar image processing device according to the present invention includes: a phase difference calculating unit that calculates a phase difference between a phase with respect to a first radio wave receiving point and a phase with respect to a second radio wave receiving point of each of a plurality of reflected signals present in each of pixels at corresponding pixel positions among a plurality of pixels included in a first suppression range and among a plurality of pixels included in a second suppression range, the first suppression range being a suppression range of reflected signals in a first radar image capturing an observation area from the first radio wave receiving point, the second suppression range being a suppression range of reflected signals in a second radar image capturing the observation area from the second radio wave receiving point; and a rotation amount calculating unit that calculates each of phase rotation amounts in the pixels included in the second suppression range from each phase difference calculated by the phase difference calculating unit, in which a difference calculating unit rotates the phases in the pixels included in the second suppression range on the basis of the respective rotation amounts calculated by the rotation amount calculating unit, and calculates a difference between pixel values of pixels at corresponding pixel position among the pixels included in the first suppression range and the pixels obtained by the phase rotation included in the second suppression range.

Advantageous Effects of Invention

According to the present invention, a reflected signal with a phase difference between the phase with respect to a first radio wave receiving point and the phase with respect to a second radio wave receiving point not being zero is also suppressed.

BRIEF DESCRIPTION OF DRAWINGS

FIG. 5 is a hardware configuration diagram of a computer in a case where the phase processing unit 12 and the image processing unit 13 are implemented by software, firmware, or the like.

DESCRIPTION OF EMBODIMENTS

Embodiments for carrying out the invention will now be described with reference to the accompanying drawings for more detailed explanation of the invention.

First Embodiment

Figure 1:
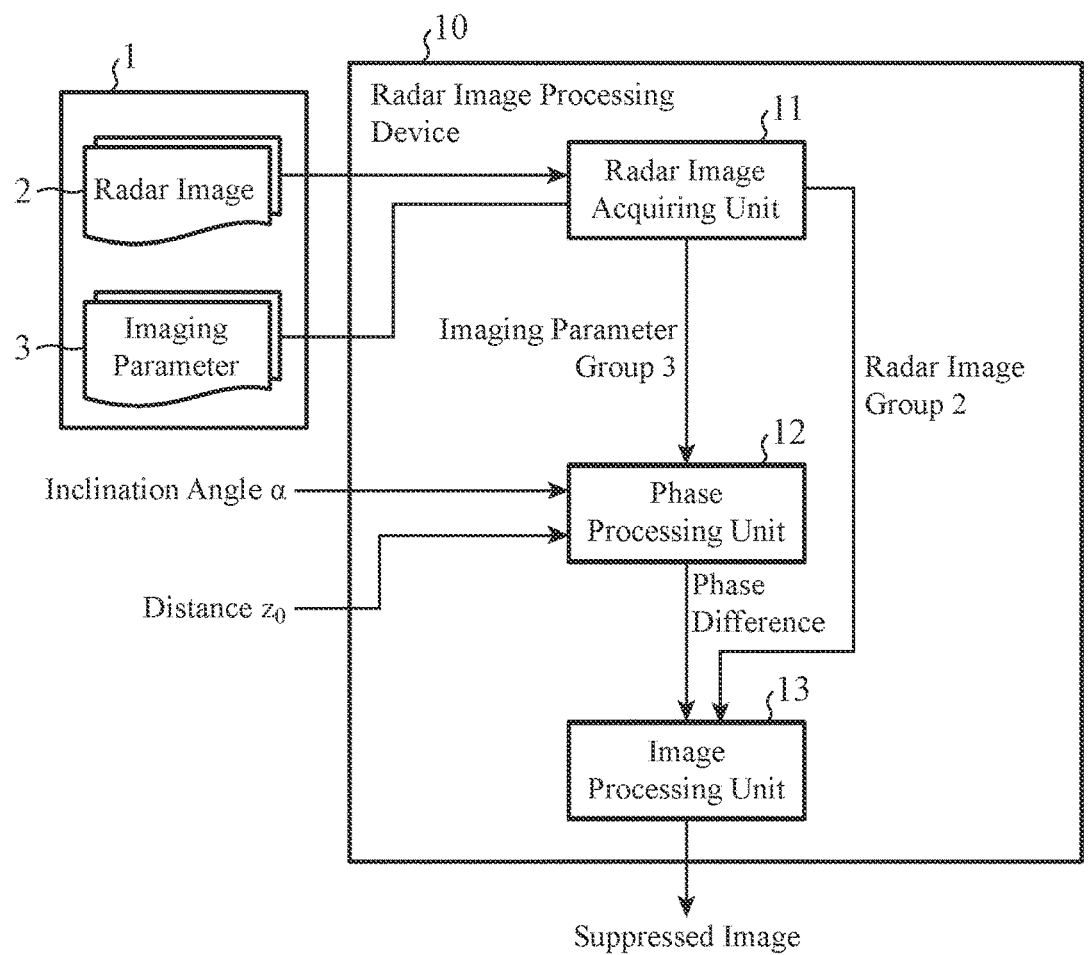
FIG. 1 is a configuration diagram illustrating a radar image processing device 10 according to a first embodiment.

FIG. 1 is a configuration diagram illustrating a radar image processing device 10 according to a first embodiment.

In FIG. 1, a radar 1 is a synthetic aperture radar (SAR), a real aperture radar, or the like, and is mounted on a platform for observing the Earth, etc. The radar 1 takes a radar image, and acquires parameters when imaging the radar image. The platform can be a satellite, an aircraft, or the like.

The radar 1 images an observation area from a radio wave receiving point, and then images the observation area again when the platform is at a radio wave receiving point near the aforementioned radio wave receiving point.

In a case of repeat-pass imaging, when the platform is a satellite, the radar 1 images an observation area from a radio wave receiving point, the platform then orbits the Earth, and the radar 1 images the same observation area again to acquire a radar image when the platform has returned to a radio wave receiving point near the aforementioned radio wave receiving point. When the platform is an aircraft, the platform is flown to repeatedly pass the same path, and the radar 1 images one observation area when the platform is at substantially the same radio wave receiving points to acquire radar images.

In a case of single-pass imaging, a plurality of radars 1 are mounted on one platform, and the radars 1 image one observation area from a radio wave receiving point to acquire radar images. In this case, the radars 1 are installed at different positions on the platform.

In addition, a plurality of radars 1 having equal imaging parameters such as wavelength are mounted on different platforms from each other, and each of the radars 1 images one observation area from a radio wave receiving point to acquire radar images.

Thus, the radars 1 image the same observation area twice from the respective radio wave receiving points, which are different from each other, to each acquire two radars; a first radar image and a second radar image.

Hereinafter, the position of the platform when the first radar image is taken will be referred to as a first radio wave receiving point, and the position of the platform when the second radar image is taken will be referred to as a second radio wave receiving point.

The first radar image and the second radar image have an equal resolution. Thus, the pixel positions of a plurality of pixels included in a first radar image and those of a plurality of pixels included in a second radar image are expressed in the same manner by (pixel,line).

"pixel" is a variable representing the position of a pixel in a slant-range direction in each of a first radar image and a second radar image, and "line" is a variable representing the position of a pixel in an azimuth direction in each of a first radar image and a second radar image.

The radar 1 transmits a radar image group 2 including a first radar image and a second radar image to the radar image processing device 10.

The radar 1 transmits an imaging parameter group 3 including a first imaging parameter associated with the first radar image and a second imaging parameter associated with the second radar image to the radar image processing device 10.

The radar image group 2 is an image group including a first radar image and a second radar image.

The types of polarization used in imaging a first radar image and in imaging a second radar image are not limited, and each of a first radar image and a second radar image may thus be any of a single-polarization radar image, a dual-polarization radar image, and a quad-polarization radar image.

Each of a first radar image and a second radar image is a radar image showing intensity distribution of radio waves emitted by the radar 1, then reflected by an observation area, and received by the radar 1.

A plurality of pixels included in a first radar image and a plurality of pixels included in a second radar image each have a complex pixel value.

A complex pixel value includes information indicating the distance between the radar 1 and a scatterer present in the observation area, and also information indicating phase shift occurring when a radio wave emitted by the radar 1 is reflected by the scatterer. Hereinafter, a "pixel value" has a value of a complex number unless otherwise noted.

An imaging parameter group 3 is a parameter group including a first imaging parameter and a second imaging parameter.

A first imaging parameter includes position information on an orbit of the platform and sensor information when a first radar image is taken by the radar 1.

A second imaging parameter includes position information on the orbit of the platform and sensor information when a second radar image is taken by the radar 1.

The position information on the path is information indicating the latitude, the longitude, and the altitude of the platform when a first radar image or a second radar image is taken by the radar 1. Thus, the position information on the path is used as information indicating a first radio wave receiving point or a second radio wave receiving point.

The sensor information includes information indicating an off-nadir angle $\theta$ of the radar 1 when a first radar image or a second radar image is taken, information indicating a wavelength $\lambda$ of a radio wave emitted from the radar 1, and information indicating an average R of distances from the radar 1 to an observation area.

The radar image processing device 10 includes a radar image acquiring unit 11, a phase processing unit 12, and an image processing unit 13.

The radar image acquiring unit 11 acquires each of a radar image group 2 and an imaging parameter group 3 transmitted from the radar 1.

The radar image acquiring unit 11 outputs the radar image group 2 to the image processing unit 13, and outputs the imaging parameter group 3 to the phase processing unit 12.

Figure 7:
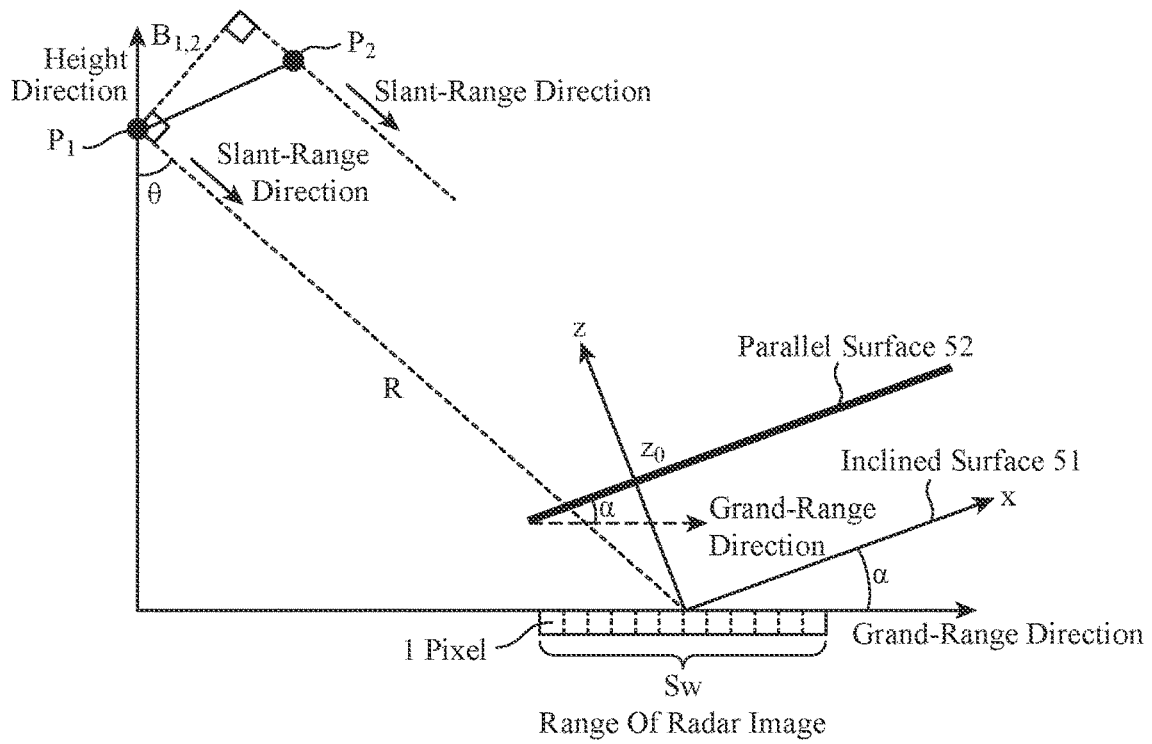
FIG. 7 is an explanatory diagram illustrating an inclined surface 51, a parallel surface 52, and imaging parameters.

The phase processing unit 12 acquires the imaging parameter group 3 output from the radar image acquiring unit 11, and the inclination angle $\alpha$ of a two-dimensional inclined surface 51 with respect to a ground-range direction (see FIG. 7).

The phase processing unit 12 also acquires the distance $z_0$ between the inclined surface 51 and a parallel surface 52 that is a surface parallel to the inclined surface 51 (see FIG. 7).

Details of the inclined surface 51 and the parallel surface 52 will be described later.

The phase processing unit 12 performs a process of calculating a phase shift component $\varphi(x)$ in an x-axis (first axis) direction on the inclined surface 51 by using the first imaging parameter, the second imaging parameter, and the inclination angle $\alpha$.

The phase processing unit 12 performs a process of calculating a phase $p(z_0)$ on the parallel surface 52 with respect to the inclined surface 51 by using the first imaging parameter, the second imaging parameter, the inclination angle $\alpha$, and the distance $z_0$.

The phase processing unit 12 performs a process of calculating, in each of a plurality of reflected signals present in each of pixels at corresponding pixel positions among a plurality of pixels included in the first radar image and among a plurality of pixels included in the second radar image, a phase difference $\Delta\varphi(x,z_0)$ between the phase with respect to the first radio wave receiving point and the phase with respect to the second radio wave receiving point.

The image processing unit 13 acquires the radar image group 2 output from the radar image acquiring unit 11, and each phase difference $\Delta\varphi(x,z_0)$ output from the phase processing unit 12.

The image processing unit 13 performs a process of calculating each of phase rotation amounts $\exp[j \cdot \Delta\varphi(x,z_0)]$ in a plurality of pixels included in the second radar image from each phase difference $\Delta\varphi(x,z_0)$ output from the phase processing unit 12.

The image processing unit 13 performs a process of rotating the phases in the pixels included in the second radar image on the basis of the respective calculated rotation amounts $\exp[j \cdot \Delta\varphi(x,z_0)]$.

The image processing unit 13 performs a process of calculating a difference between pixel values of pixels at corresponding pixel positions among a plurality of pixels included in the first radar image and among a plurality of pixels obtained by phase rotation included in the second radar image.

Figure 2:
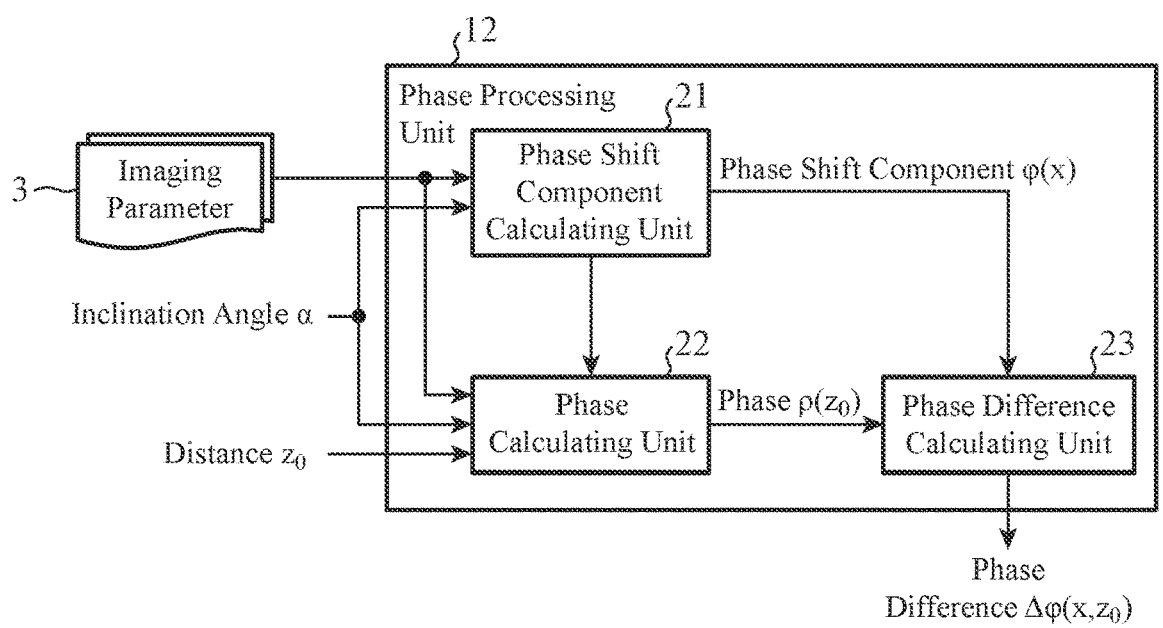
FIG. 2 is a configuration diagram illustrating a phase processing unit 12 of the radar image processing device 10 according to the first embodiment.

FIG. 2 is a configuration diagram illustrating the phase processing unit 12 of the radar image processing device 10 according to the first embodiment.

Figure 3:
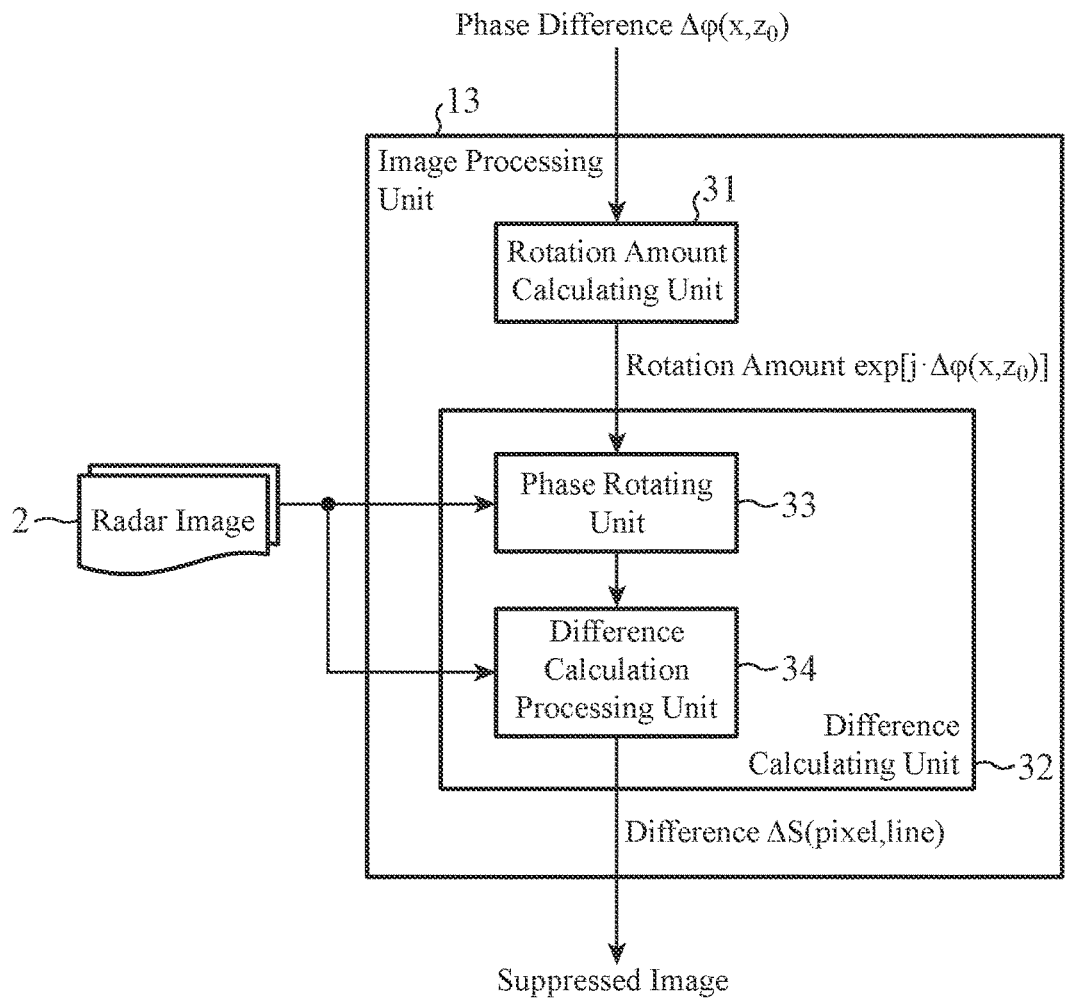
FIG. 3 is a configuration diagram illustrating an image processing unit 13 of the radar image processing device 10 according to the first embodiment.

FIG. 3 is a configuration diagram illustrating the image processing unit 13 of the radar image processing device 10 according to the first embodiment.

Figure 4:
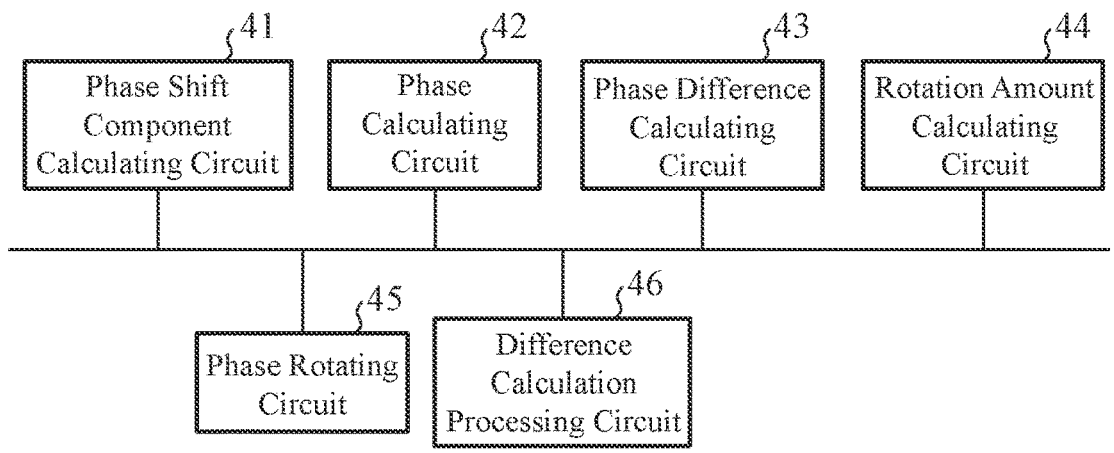
FIG. 4 is a hardware configuration diagram illustrating hardware of each of the phase processing unit 12 and the image processing unit 13.

FIG. 4 is a hardware configuration diagram illustrating hardware of each of the phase processing unit 12 and the image processing unit 13.

In FIG. 2, a phase shift component calculating unit 21 is implemented by a phase shift component calculating circuit 41 illustrated in FIG. 4, for example.

The phase shift component calculating unit 21 acquires the imaging parameter group 3 output from the radar image acquiring unit 11, and the inclination angle $\alpha$.

The phase shift component calculating unit 21 performs the process of calculating the phase shift component $\varphi(x)$ in the x-axis direction on the inclined surface 51 by using the first imaging parameter, the second imaging parameter, and the inclination angle $\alpha$.

The phase shift component calculating unit 21 outputs the phase shift component $\varphi(x)$ in the x-axis direction to a phase difference calculating unit 23.

A phase calculating unit 22 is implemented by a phase calculating circuit 42 illustrated in FIG. 4, for example.

The phase calculating unit 22 acquires the imaging parameter group 3 output from the radar image acquiring unit 11, the inclination angle $\alpha$, and the distance $z_0$.

The phase calculating unit 22 performs the process of calculating the phase $\rho(z_0)$ on the parallel surface 52 with respect to the inclined surface 51 by using the first imaging parameter, the second imaging parameter, the inclination angle α, and the distance $z_0$.

The phase calculating unit 22 outputs the phase $\rho(z_0)$ to the phase difference calculating unit 23.

The phase difference calculating unit 23 is implemented by a phase difference calculating circuit 43 illustrated in FIG. 4, for example.

The phase difference calculating unit 23 performs the process of calculating, in each of a plurality of reflected signals present in each of pixels at corresponding pixel positions among a plurality of pixels included in the first radar image and among a plurality of pixels included in the second radar image, the phase difference $\Delta\varphi(x,z_0)$ from the phase shift component $\varphi(x)$ and the phase $\rho(z_0)$.

The phase difference $\Delta\varphi(x,z_0)$ is a phase difference between the phase of each reflected signal with respect to the first radio wave receiving point and the phase of the reflected signal with respect to the second radio wave receiving point.

The phase difference calculating unit 23 outputs each phase difference $\Delta\varphi(x,z_0)$ to the image processing unit 13.

In FIG. 3, a rotation amount calculating unit 31 is implemented by a rotation amount calculating circuit 44 illustrated in FIG. 4, for example.

The rotation amount calculating unit 31 performs the process of calculating each of phase rotation amounts $\exp[j \cdot \Delta\varphi(x,z_0)]$ in a plurality of pixels included in the second radar image from each phase difference $\Delta\varphi(x,z_0)$ output from the phase difference calculating unit 23.

The rotation amount calculating unit 31 outputs each rotation amount $\exp[j \cdot \Delta\varphi(x,z_0)]$ to a phase rotating unit 33.

A difference calculating unit 32 includes the phase rotating unit 33 and a difference calculation processing unit 34.

The phase rotating unit 33 is implemented by a phase rotating circuit 45 illustrated in FIG. 4, for example.

The phase rotating unit 33 acquires the second radar image from the radar image group 2 output from the radar image acquiring unit 11.

The phase rotating unit 33 performs the process of rotating the phases in the pixels included in the second radar image on the basis of the respective rotation amounts $\exp[j \cdot \Delta\varphi(x,z_0)]$ output from the rotation amount calculating unit 31.

The phase rotating unit 33 outputs a second radar image including a plurality of pixels obtained by phase rotation to the difference calculation processing unit 34.

The difference calculation processing unit 34 is implemented by a difference calculation processing circuit 46 illustrated in FIG. 4, for example.

The difference calculation processing unit 34 acquires the first radar image from the radar image group 2 output from the radar image acquiring unit 11, and acquires the second radar image output from the phase rotating unit 33.

The difference calculation processing unit 34 performs the process of calculating a difference $\Delta S(\text{pixel},\text{line})$ between pixel values of pixels at corresponding pixel positions among a plurality of pixels included in the first radar image and among a plurality of pixels obtained by phase rotation included in the second radar image.

The difference $\Delta S(\text{pixel},\text{line})$ corresponds to a pixel of a suppressed image in which unnecessary reflected signals from the scatterer are suppressed.

The difference calculation processing unit 34 outputs the suppressed image including the respective differences $\Delta s(\text{pixel},\text{line})$ to the outside of the unit.

In FIG. 2, it is assumed that each of the phase shift component calculating unit 21, the phase calculating unit 22, and the phase difference calculating unit 23, which are components of the phase processing unit 12, is implemented by such dedicated hardware as illustrated in FIG. 4.

In addition, in FIG. 3, it is assumed that each of the rotation amount calculating unit 31, the phase rotating unit 33, and the difference calculation processing unit 34, which are components of the image processing unit 13, is implemented by such dedicated hardware as illustrated in FIG. 4.

Specifically, the phase processing unit 12 and the image processing unit 13 are assumed to be implemented by the phase shift component calculating circuit 41, the phase calculating circuit 42, the phase difference calculating circuit 43, the rotation amount calculating circuit 44, the phase rotating circuit 45, and the difference calculation processing circuit 46.

Note that each of the phase shift component calculating circuit 41, the phase calculating circuit 42, the phase difference calculating circuit 43, the rotation amount calculating circuit 44, the phase rotating circuit 45, and the difference calculation processing circuit 46 may be a single circuit, a composite circuit, a programmed processor, a parallel-programmed processor, an application specific integrated circuit (ASIC), a field-programmable gate array (FPGA), or a combination thereof, for example.

The components of the phase processing unit 12 and the components of the image processing unit 13 are not limited to those implemented by dedicated hardware. The phase processing unit 12 and the image processing unit 13 may be implemented by software, firmware, or a combination of software and firmware.

The software or firmware is stored in a memory of a computer in the form of programs. The computer refers to hardware for executing programs, and may be a central processing unit (CPU), a central processor, a processing unit, a computing unit, a microprocessor, a microcomputer, a processor, or a digital signal processor (DSP), for example.

Figure 5:
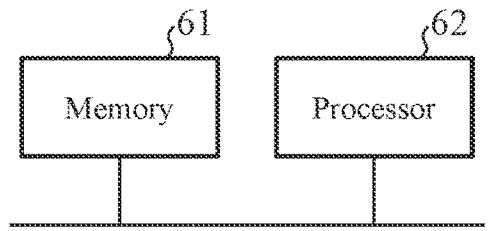

FIG. 5 is a hardware configuration diagram of a computer in a case where the phase processing unit 12 and the image processing unit 13 are implemented by software, firmware, or the like.

In the case where the phase processing unit 12 is implemented by software, firmware, or the like, programs for causing a computer to perform procedures of the phase shift component calculating unit 21, the phase calculating unit 22, and the phase difference calculating unit 23 are stored in a memory 61.

In addition, in the case where the image processing unit 13 is implemented by software, firmware, or the like, programs for causing a computer to perform procedures of the rotation amount calculating unit 31, the phase rotating unit 33, and the difference calculation processing unit 34 are stored in the memory 61.

A processor 62 of the computer thus executes the programs stored in the memory 61.

In addition, FIG. 4 illustrates an example in which each of the components of the phase processing unit 12 and the components of the image processing unit 13 is implemented by dedicated hardware, and FIG. 5 illustrates an example in which the phase processing unit 12 and the image processing unit 13 is implemented by software, firmware, or the like.

The implementations are not limited to the above, and some components of the phase processing unit 12 and some components of the image processing unit 13 may be implemented by dedicated hardware and others may be implemented by software, firmware, and the like, for example.

Next, the operation of the radar image processing device 10 illustrated in FIG. 1 will be explained.

The radar 1 transmits a radar image group 2 including a first radar image and a second radar image, and an imaging parameter group 3 including a first imaging parameter and a second imaging parameter to the radar image processing device 10.

The radar image acquiring unit 11 acquires each of a radar image group 2 and an imaging parameter group 3 transmitted from the radar 1.

The radar image acquiring unit 11 outputs the radar image group 2 to the image processing unit 13, and outputs the imaging parameter group 3 to the phase processing unit 12.

The pixel values of the pixels included in radar images (the first radar image, the second radar image) are complex numbers that are expressed as in the following formula (1).

$$S(\text{pixel,line}) = Av(\text{pixel,line})\exp[j\Psi(\text{pixel,line})] \quad (1)$$

In the formula (1), Av(pixel,line) represents the amplitude of a pixel at a pixel position (pixel,line).

$\Psi$(pixel,line) represents the phase (argument) of a pixel at a pixel position (pixel,line).

j is a symbol representing an imaginary unit.

The phase processing unit 12 performs a process of calculating a phase difference $\Delta\varphi(x,z_0)$.

Figure 6:
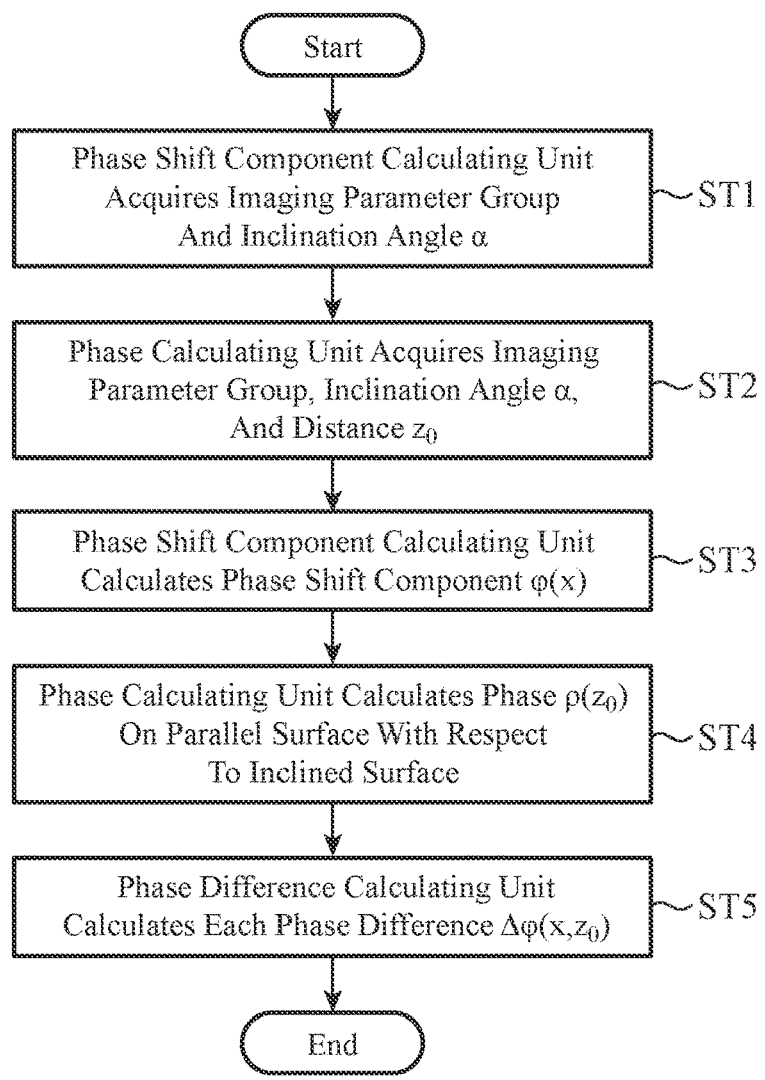
FIG. 6 is a flowchart illustrating processing of the phase processing unit 12.

FIG. 6 is a flowchart illustrating the processing of the phase processing unit 12.

The processing of the phase processing unit 12 will now be explained in detail with reference to FIG. 6.

The phase shift component calculating unit 21 acquires the imaging parameter group 3 output from the radar image acquiring unit 11, and the inclination angle $\alpha$ (step ST1 in FIG. 6).

The phase calculating unit 22 acquires the imaging parameter group 3 output from the radar image acquiring unit 11, the inclination angle $\alpha$, and the distance $z_0$ (step ST2 in FIG. 6).

The inclination angle $\alpha$ is a parameter set in advance by a user, and expressed as in FIG. 7, for example.

The distance $z_0$ is a parameter set in advance by a user, and expressed as in FIG. 7, for example.

Each of the inclination angle $\alpha$ and the distance $z_0$ may be provided to the phase calculating unit 22 by manual operation made by a user, or may be provided to the phase calculating unit 22 from an external device, which is not illustrated, for example.

FIG. 7 is an explanatory diagram illustrating the inclined surface 51, the parallel surface 52, and the imaging parameters.

In FIG. 7, the inclined surface 51 is a two-dimensional surface included in common in the first radar image and the second radar image.

The direction of the x axis, which is the first axis, of the inclined surface 51 is a direction inclined by the inclination angle $\alpha$ with respect to the ground-range direction, and the direction of a second axis of the inclined surface 51 is the azimuth direction (the depth direction from the sheet surface of FIG. 7).

The parallel surface 52 is a surface parallel to the inclined surface 51 and at a distance of $z_0$ from the inclined surface 51.

In a case where the inclined surface 51 is a flat roof of a building built vertically on a horizontal ground surface, for example, the inclination angle $\alpha$ is set to 0 degrees.

In a case where the inclined surface 51 is a wall surface of a building built vertically on a horizontal ground surface, for example, inclination angle $\alpha$ is set to 90 degrees.

$P_1$ represents the first radio wave receiving point, and $P_2$ represents the second radio wave receiving point.

The first radio wave receiving point $P_1$ is a center position on the orbit of the platform when the first radar image is taken, and the second radio wave receiving point $P_2$ is a center position on the orbit of the platform when the second radar image is taken.

$B_{1,2}$ represents a distance component, in a direction perpendicular to the direction (hereinafter referred to as a "slant-range direction") of a radio wave emitted by the radar 1, of the distance between the first radio wave receiving point $P_1$ and the second radio wave receiving point $P_2$.

$\theta$ is an off-nadir angle, which is an angle between a vertically downward direction from the platform and the slant-range direction.

R represents an average of the distance between the first radio wave receiving point $P_1$ and the observation area and the distance between the second radio wave receiving point $P_2$ and the observation area.

The distance component $B_{1,2}$, the off-nadir angle $\theta$, and the average R of the distances are information included in the imaging parameters.

Sw represents a range of the first radar image and a range of the second radar image that capture an observation object.

The range Sw of the first radar image and the range Sw of the second radar image are the same as each other.

Herein, because the distance between the first radio wave receiving point $P_1$ and the observation area and the distance between the second radio wave receiving point $P_2$ and the observation area are long, the phase shift component calculating unit 21 assumes that each of the off-nadir angle $\theta$ and the average R of the distances does not change.

Specifically, the off-nadir angle $\theta$ included in the first imaging parameter and the off-nadir angle $\theta$ included in the second imaging parameter are the same value.

In addition, the average R of the distances included in the first imaging parameter and the average R of the distances included in the second imaging parameter are the same value.

In addition, a pixel at a pixel position (pixel,line) among a plurality of pixels included in the first radar image and a pixel at a pixel position (pixel,line) among a plurality of pixels included in the second radar image are pixels at the same pixel position.

Figure 8:
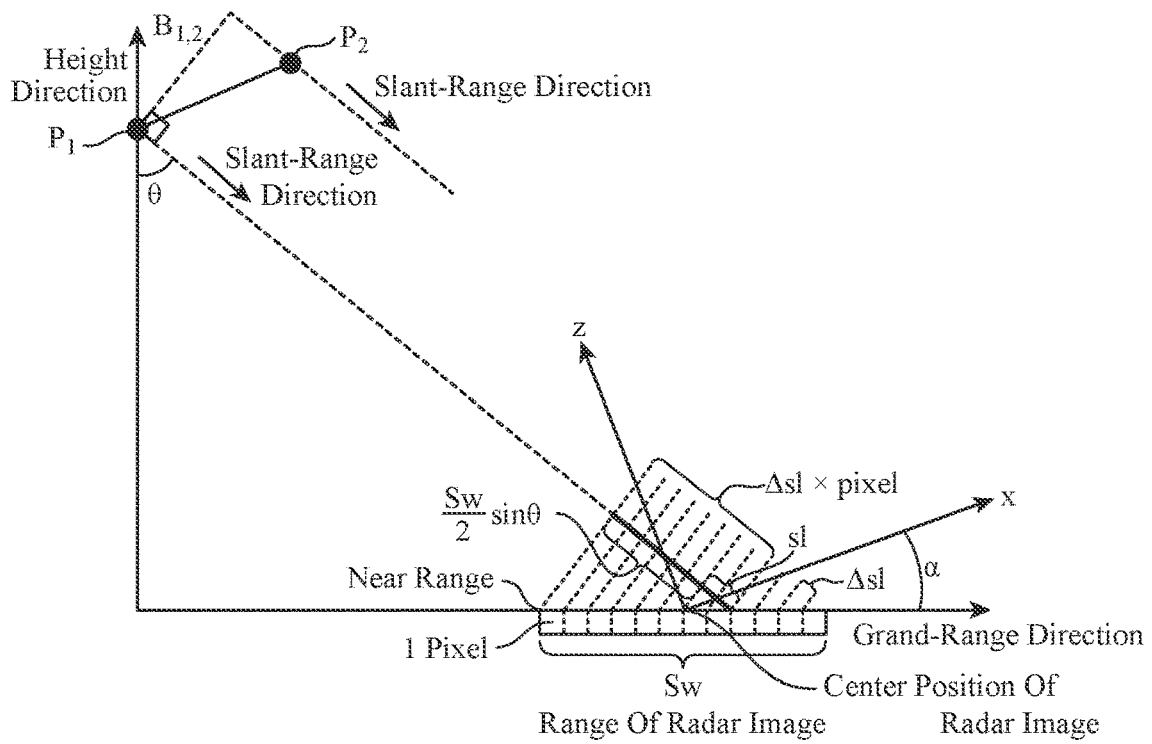
FIG. 8 is an explanatory diagram illustrating the relation of a spacing Δsl of pixels in a slant-range direction, the range Sw of radar images (a first radar image, a second radar image) and the distance sl from a position in the slant-range direction corresponding to the center position of the radar image to an observation area.

FIG. 8 is an explanatory diagram illustrating the relation of a spacing $\Delta sl$ of pixels in the slant-range direction, the range Sw of range images (the first radar image, the second radar image), and the distance sl from a position in the slant-range direction corresponding to the center position of the radar image to the observation area.

In FIG. 8, the distance from a position in the slant-range direction corresponding to a near range of the radar image to a position in the slant-range direction corresponding to the center position of the radar image is (Sw/2) sin.

Thus, the distance sl is expressed as in the following formula (2).

$$sl = \Delta sl \times \text{pixel} - \frac{Sw}{2}\sin\theta \quad (2)$$

Each of the spacing $\Delta sl$ and the range Sw of the radar images is information included in the imaging parameters.

In addition, the relation between a position x in the x-axis direction on the inclined surface 51 and the distance sl is expressed as in the following formula (3) on the basis of the center position of the radar image.

$$sl = x \sin(\theta - \alpha) \quad (3)$$

The following formula (4) is satisfied on the basis of the formula (2) and the formula (3).

$$x\sin(\theta - \alpha) = \Delta sl \times \text{pixel} - \frac{Sw}{2}\sin\theta \quad (4)$$

The phase shift component calculating unit 21 calculates the position x on the inclined surface 51 corresponding to a pixel position "pixel" in the slant-range direction in the radar image by substituting the position "pixel" into the formula (4).

A plurality of reflected signals from scatterers are present in the pixel at the position "pixel" substituted into the formula (4).

The position "pixel" substituted into the formula (4) may be provided to the phase shift component calculating unit 21 by manual operation made by a user, or may be provided to the phase shift component calculating unit 21 from an external device, which is not illustrated, for example.

The phase shift component calculating unit 21 calculates the phase shift component $\varphi(x)$ at the position x in the x-axis direction on the inclined surface 51 by using the distance component $B_{1,2}$, the off-nadir angle $\theta$, the average R of the distances, the wavelength $\lambda$ of the emitted radio wave, the inclination angle $\alpha$, and an observation path parameter p (step ST3 in FIG. 6).

The observation path parameter p is a parameter indicating whether the observation path when the radar image is taken is repeat pass or single pass, which is p=2 in the case of repeat pass or p=1 in the case of single pass. The observation path parameter p may be provided to the phase shift component calculating unit 21 and the phase calculating unit 22 by manual operation made by a user, or may be provided to the phase shift component calculating unit 21 and the phase calculating unit 22 from an external device, which is not illustrated, for example.

The following formula (5) is a formula for calculating the phase shift component $\varphi(x)$ used by the phase shift component calculating unit 21.

$$\phi(x) = \left(\frac{2p\pi B_{1,2}\cos(\theta - \alpha)}{\lambda R}\right)x \quad (5)$$

The phase shift component calculating unit 21 outputs the phase shift component $\varphi(x)$ in the x-axis direction to the phase difference calculating unit 23.

The phase calculating unit 22 calculates the phase $\rho(z_0)$ on the parallel surface 52 with respect to the inclined surface 51 by using the distance component $B_{1,2}$, the off-nadir angle $\theta$, the average R of the distances, the wavelength $\lambda$ of the emitted radio wave, the inclination angle $\alpha$, the distance $z_0$, and the observation path parameter p (step ST4 in FIG. 6).

The following formula (6) is a formula for calculating the phase $\rho(z_0)$ used by the phase calculating unit 22.

$$\rho(z_0) = \left(\frac{2p\pi B_{1,2}}{\lambda R \sin(\theta - \alpha)}\right)z_0 \quad (6)$$

The phase calculating unit 22 outputs the phase $\rho(z_0)$ to the phase difference calculating unit 23.

The phase difference calculating unit 23 calculates, in each of a plurality of reflected signals present in each of pixels at corresponding pixel positions among a plurality of pixels included in the first radar image and among a plurality of pixels included in the second radar image, the phase difference $\Delta\varphi(x,z_0)$ by using the phase shift component $\varphi(x)$ and the phase $\rho(z_0)$ (step ST5 in FIG. 6).

The phase difference $\Delta\varphi(x,z_0)$ is a phase difference, in each of the reflected signals, between the phase of the reflected signal with respect to the first radio wave receiving point $P_1$ and the phase of the reflected signal with respect to the second radio wave receiving point $P_2$.

The following formula (7) is a formula for calculating the phase difference $\Delta\varphi(x,z_0)$ used by the phase difference calculating unit 23.

$$\Delta\phi(X,z_0) = \phi(x) + \rho(z_0) \quad (7)$$

The phase difference calculating unit 23 outputs each phase difference $\Delta\varphi(x,z_0)$ to the image processing unit 13.

The image processing unit 13 performs a process of acquiring a suppressed image.

Figure 9:
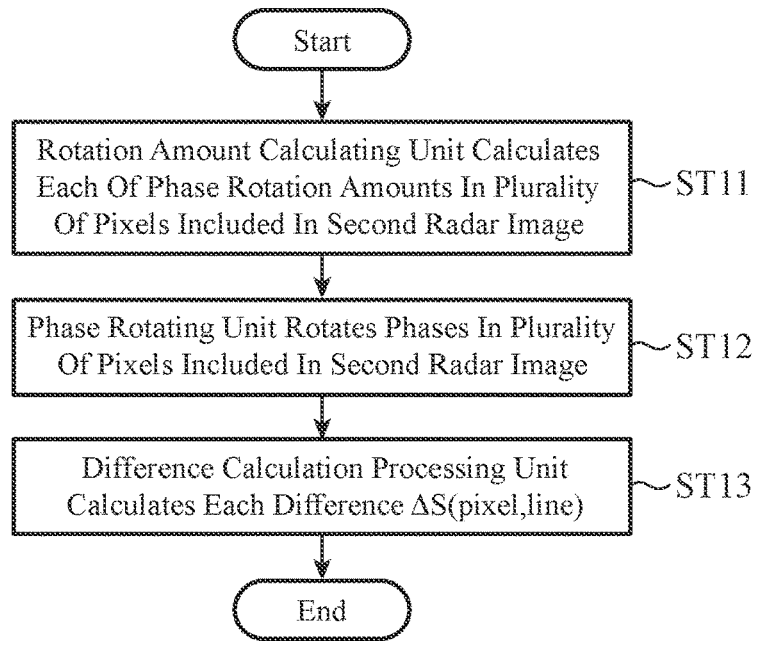
FIG. 9 is a flowchart illustrating processing of the image processing unit 13.

FIG. 9 is a flowchart illustrating the processing of the image processing unit 13.

The processing of the image processing unit 13 will now be explained in detail with reference to FIG. 9.

The rotation amount calculating unit 31 acquires each phase difference $\Delta\varphi(x,z_0)$ output from the phase difference calculating unit 23.

The rotation amount calculating unit 31 calculates each of phase rotation amounts $\exp[j\cdot\Delta\varphi(x,z_0)]$ in a plurality of pixels included in the second radar image from each phase difference $\Delta\varphi(x,z_0)$ (step ST11 in FIG. 9).

The rotation amount calculating unit 31 outputs each rotation amount $\exp[j\cdot\Delta\varphi(x,z_0)]$ to a phase rotating unit 33.

The phase rotating unit 33 acquires the second radar image from the radar image group 2 output from the radar image acquiring unit 11.

The phase rotating unit 33 performs the process of rotating the phases in the pixels included in the second radar image on the basis of the respective rotation amounts $\exp[j\cdot\Delta\varphi(x,z_0)]$ output from the rotation amount calculating unit 31 (step ST12 in FIG. 9).

The following formula (8) is a formula representing the process of rotating a phase performed by the phase rotating unit 33.

$$S_2'(\text{pixel},\text{line}) = S_2(\text{pixel},\text{line})\exp[j\Delta\phi(x,z_0)] \quad (8)$$

In the formula (8), $S_2(\text{pixel},\text{line})$ represents the pixel value of a pixel included in the second radar image output from the radar image acquiring unit 11, and $S_2'(\text{pixel},\text{line})$ represents the pixel value of a pixel included in the second radar image obtained by rotation of the phase in the pixel by the phase rotating unit 33.

The phase rotating unit 33 outputs a second radar image including a plurality of pixels obtained by phase rotation to the difference calculation processing unit 34.

The difference calculation processing unit 34 acquires the first radar image from the radar image group 2 output from the radar image acquiring unit 11, and acquires the second radar image including a plurality of pixels obtained by the phase rotation and output from the phase rotating unit 33.

The difference calculation processing unit 34 calculates a difference $\Delta S(\text{pixel},\text{line})$ between pixel values of pixels at corresponding pixel positions among a plurality of pixels included in the first radar image and among a plurality of pixels obtained by phase rotation included in the second radar image (step ST13 in FIG. 9).

The following formula (9) is a formula for calculating the difference ΔS(pixel,line) used by the difference calculation processing unit 34.

$$\Delta S(\text{pixel,line}) = S_1(\text{pixel,line}) - S_2'(\text{pixel,line}) \quad (9)$$

In the formula (9), $S_1(\text{pixel,line})$ represents the pixel value of a pixel included in the first radar image.

The difference calculation processing unit 34 outputs the suppressed image including the respective differences Δs(pixel,line) to the outside of the unit.

Figure 10:
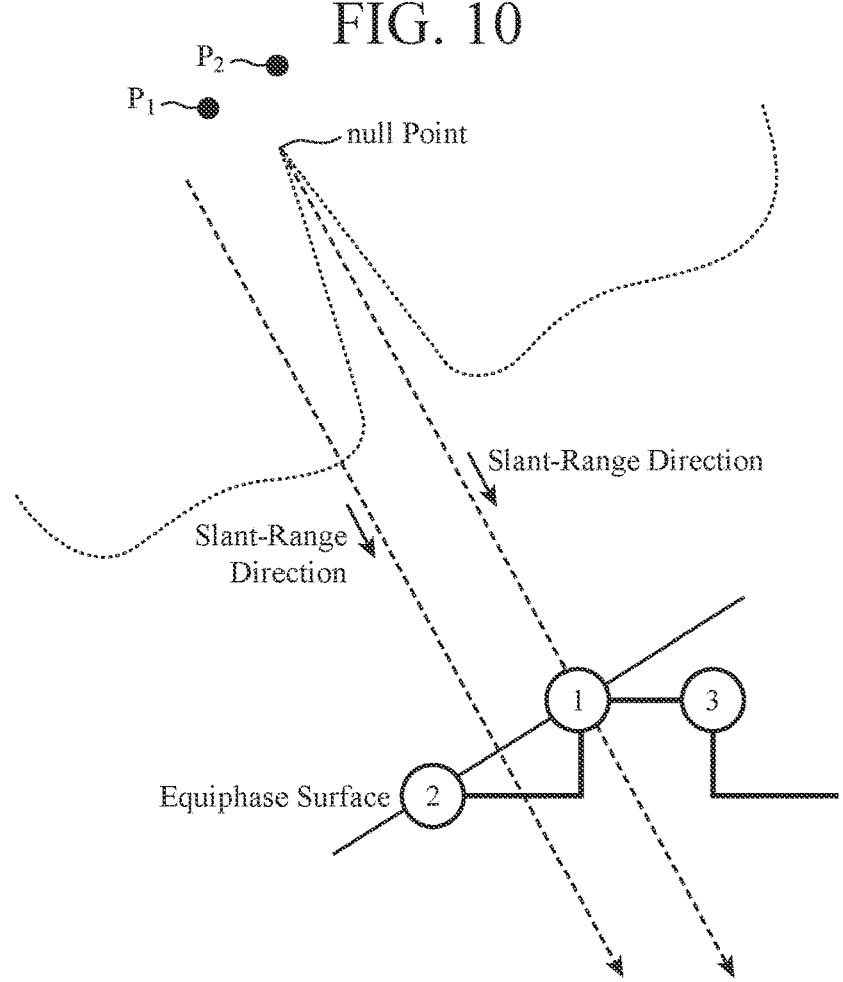
FIG. 10 is an explanatory diagram illustrating suppression of reflected signals present in one pixel in a case where the phases in pixels included in the second radar image are not rotated by a phase rotating unit 33.

Here, FIG. 10 is an explanatory diagram illustrating suppression of reflected signals present in one pixel in a case where the phases in the pixels included in the second radar image are not rotated by the phase rotating unit 33.

In FIG. 10, regarding a reflected signal assigned with "1", the distance from the scatterer that scatters the reflected signal to the first radio wave receiving point $P_1$ and the distance from the scatterer that scatters the reflected signal to the second radio wave receiving point $P_2$ are equal to each other. Thus, regarding the reflected signal assigned with "1", the phase difference $\Delta\varphi(x,z_0)$ between the phase with respect to the first radio wave receiving point $P_1$ and the phase with respect to the second radio wave receiving point $P_2$ is zero.

Because the difference ΔS(pixel,line) for the reflected signal assigned with "1" is thus zero, the reflected signal assigned with "1" is suppressed.

Regarding a reflected signal assigned with "2", the distance from the scatterer that scatters the reflected signal to the first radio wave receiving point $P_1$ and the distance from the scatterer that scatters the reflected signal to the second radio wave receiving point $P_2$ are not equal to each other. Thus, regarding the reflected signal assigned with "2", the phase difference $\Delta\varphi(x,z_0)$ between the phase with respect to the first radio wave receiving point $P_1$ and the phase with respect to the second radio wave receiving point $P_2$ is other than zero.

Because the difference ΔS(pixel,line) for the reflected signal assigned with "2" is thus other than zero, the reflected signal assigned with "2" is not suppressed.

Regarding a reflected signal assigned with "3" as well, the distance from the scatterer that scatters the reflected signal to the first radio wave receiving point $P_1$ and the distance from the scatterer that scatters the reflected signal to the second radio wave receiving point $P_2$ are not equal to each other. Thus, regarding the reflected signal assigned with "3", the phase difference $\Delta\varphi(x,z_0)$ between the phase with respect to the first radio wave receiving point $P_1$ and the phase with respect to the second radio wave receiving point $P_2$ is other than zero.

Because the difference ΔS(pixel,line) for the reflected signal assigned with "3" is thus other than zero, the reflected signal assigned with "3" is not suppressed.

Figure 11:
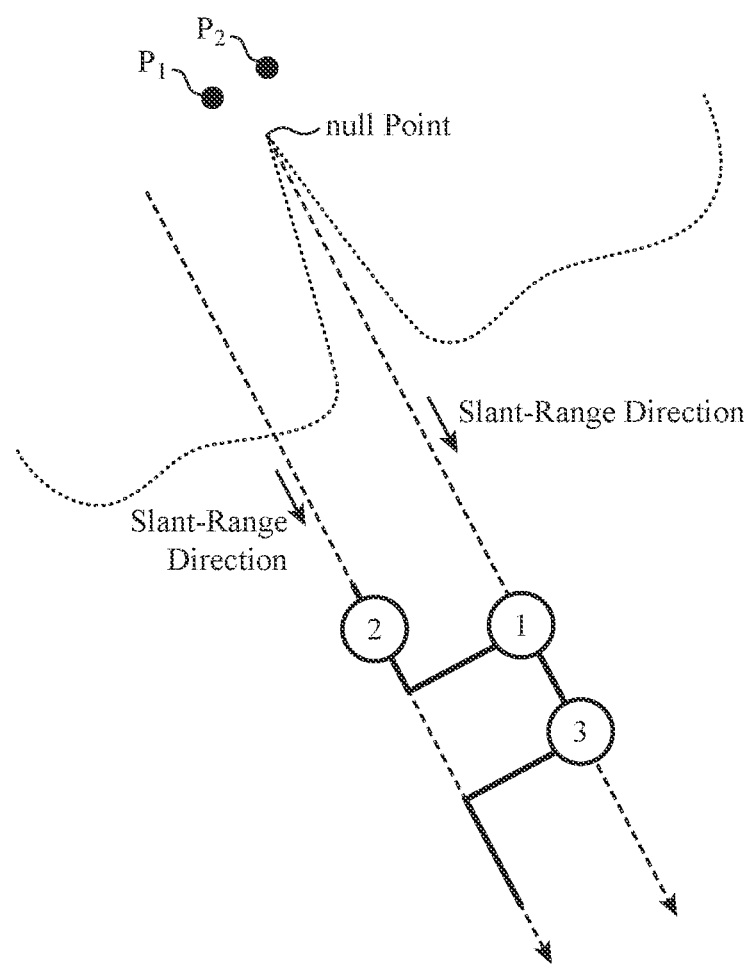
FIG. 11 is an explanatory diagram illustrating suppression of reflected signals present in one pixel in a case where the phases in pixels included in the second radar image are rotated by the phase rotating unit 33.

FIG. 11 is an explanatory diagram illustrating suppression of reflected signals present in one pixel in a case where the phases in pixels included in the second radar image are rotated by the phase rotating unit 33.

Regarding a reflected signal assigned with "1", as illustrated in FIG. 10, the distance from the scatterer that scatters the reflected signal to the first radio wave receiving point $P_1$ and the distance from the scatterer that scatters the reflected signal to the second radio wave receiving point $P_2$ are equal to each other. Thus, regarding the reflected signal assigned with "1", the phase difference $\Delta\varphi(x,z_0)$ between the phase with respect to the first radio wave receiving point $P_1$ and the phase with respect to the second radio wave receiving point $P_2$ is zero, and the phase rotation amount $\exp[j\cdot\Delta\varphi(x,z_0)]$ calculated by the rotation amount calculating unit 31 is zero.

Regarding the reflected signal assigned with "1", because the phase rotation amount $\exp[j\cdot\Delta\varphi(x,z_0)]$ is zero, the phase is not rotated by the phase rotating unit 33 as illustrated in FIGS. 10 and 11. Thus, because the phase difference $\Delta\varphi(x,z_0)$ is still zero for the reflected signal assigned with "1", the difference ΔS(pixel,line) is zero, and the reflected signal assigned with "1" is thus suppressed.

Regarding a reflected signal assigned with "2", as illustrated in FIG. 10, the distance from the scatterer that scatters the reflected signal to the first radio wave receiving point $P_1$ and the distance from the scatterer that scatters the reflected signal to the second radio wave receiving point $P_2$ are not equal to each other. Thus, regarding the reflected signal assigned with "2", the phase difference $\Delta\varphi(x,z_0)$ between the phase with respect to the first radio wave receiving point $P_1$ and the phase with respect to the second radio wave receiving point $P_2$ is other than zero. Thus, the phase rotation amount $\exp[j\cdot\Delta\varphi(x,z_0)]$ calculated by the rotation amount calculating unit 31 is other than zero.

Regarding the reflected signal assigned with "2" resulting from phase rotation, as illustrated in FIG. 11, the distance to the first radio wave receiving point $P_1$ and the distance to the second radio wave receiving point $P_2$ are not equal to each other even after the rotation by the rotation amount $\exp[j\cdot\Delta\varphi(x,z_0)]$ by the phase rotating unit 33. Thus, regarding the reflected signal assigned with "2" resulting from the phase rotation, the phase difference $\Delta\varphi(x,z_0)$ between the phase with respect to the first radio wave receiving point $P_1$ and the phase with respect to the second radio wave receiving point $P_2$ is other than zero.

Because the difference ΔS(pixel,line) for the reflected signal assigned with "2" resulting from the phase rotation is thus other than zero, the reflected signal assigned with "2" resulting from the phase rotation is not suppressed.

Regarding a reflected signal assigned with "3", as illustrated in FIG. 10, the distance from the scatterer that scatters the reflected signal to the first radio wave receiving point $P_1$ and the distance from the scatterer that scatters the reflected signal to the second radio wave receiving point $P_2$ are not equal to each other. Thus, regarding the reflected signal assigned with "3", the phase difference $\Delta\varphi(x,z_0)$ between the phase with respect to the first radio wave receiving point $P_1$ and the phase with respect to the second radio wave receiving point $P_2$ is other than zero. Thus, the phase rotation amount $\exp[j\cdot\Delta\varphi(x,z_0)]$ calculated by the rotation amount calculating unit 31 is other than zero.

Regarding the reflected signal assigned with "3", as illustrated in FIG. 11, the distance to the first radio wave receiving point $P_1$ and the distance to the second radio wave receiving point $P_2$ have become equal to each other as a result of the rotation by the rotation amount $\exp[j\cdot\Delta\varphi(x,z_0)]$ by the phase rotating unit 33. Thus, regarding the reflected signal assigned with "3" resulting from the phase rotation, the phase difference $\Delta\varphi(x,z_0)$ between the phase with respect to the first radio wave receiving point $P_1$ and the phase with respect to the second radio wave receiving point $P_2$ is zero.

Because the difference ΔS(pixel,line) for the reflected signal assigned with "3" resulting from the phase rotation is thus zero, the reflected signal assigned with "3" resulting from the phase rotation is suppressed.

In the first embodiment described above, the radar image processing device 10 has a configuration including the phase difference calculating unit 23 that calculates a phase difference between the phase with respect to a first radio wave receiving point and the phase with respect to a second radio wave receiving point of each of a plurality of reflected signals present in one pixel, and the rotation amount calculating unit 31 that calculates each of the phase rotation amounts in a plurality of pixels included in the second radar image from the respective phase differences, in which the difference calculating unit 32 rotates the phases in the pixels included in the second radar image on the basis of the respective rotation amounts, and calculates a difference between pixel values of pixels at corresponding pixel positions among the pixels included in the first radar image and the pixels obtained by the phase rotation included in the second radar image. The radar image processing device 10 is therefore capable of also suppressing a reflected signal with the phase difference between the phase with respect to the first radio wave receiving point and the phase with respect to the second radio wave receiving point not being zero.

Second Embodiment

The first embodiment presents an example in which the radar image processing device 10 acquires a radar image group 2 including a first radar image and a second radar image, and outputs a suppressed image.

In a second embodiment, a radar image processing device 10 that acquires a radar image group 2 including two or more radar images capturing the same observation area taken from radio wave receiving points different from each other, and outputs a suppressed image will be described.

In the radar image processing device 10 of the second embodiment, the phase processing unit 12 and the image processing unit 13 perform processes on each combination of two radar images included in the radar image group 2. In this case, one radar image included in each combination will be referred to as a first radar image, and the other radar image included in the combination will be referred to a second radar image.

Specifically, the phase shift component calculating unit 21, the phase calculating unit 22, and the phase difference calculating unit 23 repeat the process of calculating the phase difference $\Delta\varphi_i(x,z_0)$ until the process of calculating the phase difference $\Delta\varphi(x,z_0)$ is completed for all of the combinations i of two radar images. i is a variable representing a combination of two radar images.

The rotation amount calculating unit 31, the phase rotating unit 33, and the difference calculation processing unit 34 repeat the process of calculating the difference $\Delta S_i$(pixel, line) until the process of calculating the difference $\Delta S_i$(pixel, line) is completed for all of the combinations i of two radar images.

The radar image processing device 10 in the second embodiment has a configuration as illustrated in FIG. 1, that is similar to the radar image processing device 10 of the first embodiment.

The phase processing unit 12 in the second embodiment has a configuration as illustrated in FIG. 2, that is similar to the phase processing unit 12 of the first embodiment.

Note that the radar image group 2 includes two or more radar images, and the imaging parameter group 3 includes two or more imaging parameters.

Figure 12:
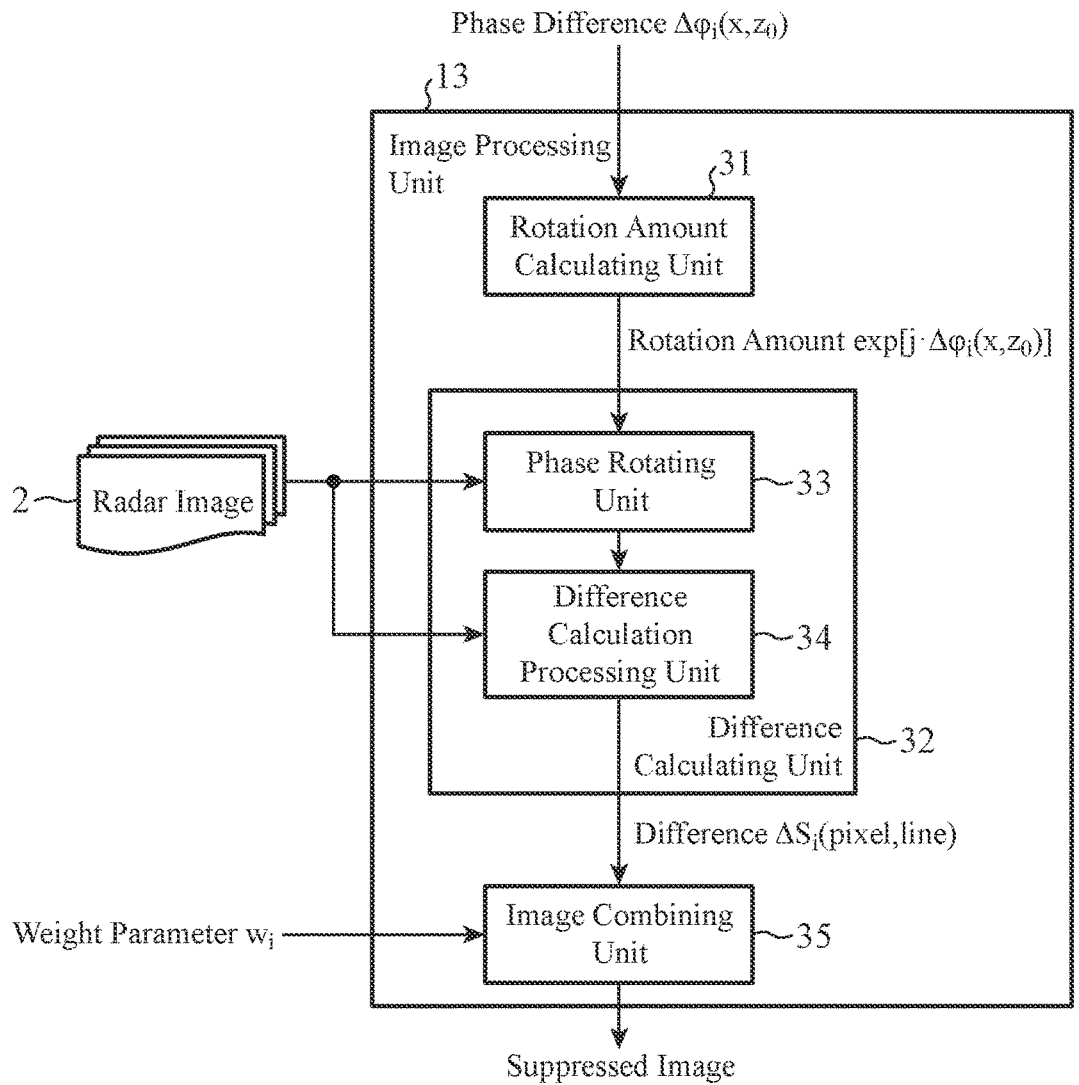
FIG. 12 is a configuration diagram illustrating an image processing unit 13 of a radar image processing device 10 according to a second embodiment.

FIG. 12 is a configuration diagram illustrating an image processing unit 13 of the radar image processing device 10 according to the second embodiment.

Figure 13:
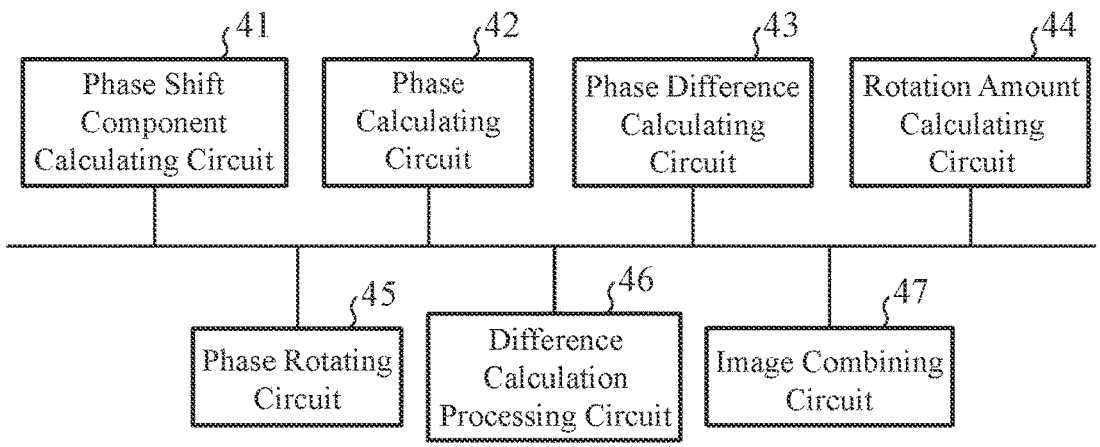
FIG. 13 is a hardware configuration diagram illustrating hardware of each of a phase processing unit 12 and the image processing unit 13.

FIG. 13 is a hardware configuration diagram illustrating hardware of each of the phase processing unit 12 and the image processing unit 13.

In FIGS. 12 and 13, reference numerals that are the same as those in FIGS. 3 and 4 represent the same or corresponding components, and the description thereof will thus not be repeated.

An image combining unit 35 is implemented by an image combining circuit 47 illustrated in FIG. 13, for example.

The image combining unit 35 acquires a weight parameter $w_i$ used for generation of a suppressed image.

The image combining unit 35 performs a process of combining differences $\Delta S_i$(pixel,line) at corresponding pixel positions among the respective differences calculated for the respective combinations i by the difference calculation processing unit 34 by using the weight parameter $w_i$.

The image combining unit 35 outputs a suppressed image including the respective differences $S_{sup}$(pixel,line) resulting from the combining to the outside of the unit.

In FIG. 2, it is assumed that each of the phase shift component calculating unit 21, the phase calculating unit 22, and the phase difference calculating unit 23, which are components of the phase processing unit 12, is implemented by such dedicated hardware as illustrated in FIG. 13.

In addition, in FIG. 12, it is assumed that each of the rotation amount calculating unit 31, the phase rotating unit 33, the difference calculation processing unit 34, and the image combining unit 35, which are components of the image processing unit 13, is implemented by such dedicated hardware as illustrated in FIG. 13.

Specifically, the phase processing unit 12 and the image processing unit 13 are assumed to be implemented by the phase shift component calculating circuit 41, the phase calculating circuit 42, the phase difference calculating circuit 43, the rotation amount calculating circuit 44, the phase rotating circuit 45, the difference calculation processing circuit 46, and the image combining circuit 47.

Note that each of the phase shift component calculating circuit 41, the phase calculating circuit 42, the phase difference calculating circuit 43, the rotation amount calculating circuit 44, the phase rotating circuit 45, the difference calculation processing circuit 46, and the image combining circuit 47 may be a single circuit, a composite circuit, a programmed processor, a parallel-programmed processor, an ASIC, an FPGA, or a combination thereof, for example.

The components of the phase processing unit 12 and the components of the image processing unit 13 are not limited to those implemented by dedicated hardware. The phase processing unit 12 and the image processing unit 13 may be implemented by software, firmware, or a combination of software and firmware.

In the case where the phase processing unit 12 is implemented by software, firmware, or the like, programs for causing a computer to perform procedures of the phase shift component calculating unit 21, the phase calculating unit 22, and the phase difference calculating unit 23 are stored in the memory 61 illustrated in FIG. 5.

In addition, in the case where the image processing unit 13 is implemented by software, firmware, or the like, programs for causing a computer to perform procedures of the rotation amount calculating unit 31, the phase rotating unit 33, the difference calculation processing unit 34, and the image combining unit 35 are stored in the memory 61.

A processor 62 of the computer thus executes the programs stored in the memory 61.

Next, the operation of the radar image processing device 10 will be explained.

The phase processing unit 12 performs a process of calculating the phase difference $\Delta\varphi_i(x,z_0)$ for each combination i of two radar images among the two or more radar images included in the radar image group 2.

The phase shift component calculating unit 21 acquires a combination of two imaging parameters associated with the two radar images from the imaging parameter group 3 output from the radar image acquiring unit 11.

Herein, one radar image included in the combination i will be referred to as a first radar image, and the other radar image included in the combination i will be referred to as a second radar image.

A radio wave receiving point for a first radar image included in one combination and a radio wave receiving point for a first radar image included in another combination are different from each other. Herein, however, for convenience of explanation, both of such radio wave receiving points will be referred to as first radio wave receiving points $P_1$.

In addition, a radio wave receiving point for a second radar image included in one combination and a radio wave receiving point for a second radar image included in another combination are different from each other. Herein, however, for convenience of explanation, both of such radio wave receiving points will be referred to as second radio wave receiving points $P_2$.

An imaging parameter associated with the first radar image will be referred to as a first imaging parameter, and an imaging parameter associated with the second radar image will be referred to as a second imaging parameter.

In addition, the phase shift component calculating unit 21 acquires the inclination angle $\alpha$.

The phase calculating unit 22 acquires the first imaging parameter, the second imaging parameter, the inclination angle $\alpha$, and the distance $z_0$.

The phase shift component calculating unit 21 calculates the position x on the inclined surface 51 corresponding to a pixel position "pixel" in the slant-range direction in the radar image by substituting the position "pixel" into the formula (4).

The pixel at the position "pixel" substituted into the formula (4) is a pixel in which a plurality of reflected signals from scatterers are present.

The phase shift component calculating unit 21 calculates the phase shift component $\varphi_i(x)$ in the x-axis direction on the inclined surface 51 by using the distance component $B_{1,2}$, the off-nadir angle $\theta$, the average R of the distances, the wavelength $\lambda$ of the emitted radio wave, the inclination angle $\alpha$, and the observation path parameter p.

The following formula (10) is a formula for calculating the phase shift component $\varphi_i(x)$ used by the phase shift component calculating unit 21.

$$\phi_i(x) = \left(\frac{2p\pi B_{1,2}\cos(\theta - \alpha)}{\lambda R}\right)x \tag{10}$$

The phase shift component calculating unit 21 outputs the phase shift component $\varphi_i(x)$ in the x-axis direction to the phase difference calculating unit 23.

The phase calculating unit 22 calculates the phase $\rho_i(z_0)$ on the parallel surface 52 with respect to the inclined surface 51 by using the distance component $B_{1,2}$, the off-nadir angle $\theta$, the average R of the distances, the wavelength $\lambda$ of the emitted radio wave, the inclination angle $\alpha$, the distance $z_0$, and the observation path parameter p. The same applies to the phase $\rho_i(z_0)$ in any combination.

The following formula (11) is a formula for calculating the phase $\rho_i(z_0)$ used by the phase calculating unit 22.

$$\rho_i(z_0) = \left(\frac{2p\pi B_{1,2}}{\lambda R\sin(\theta - \alpha)}\right)z_0 \tag{11}$$

The phase calculating unit 22 outputs the phase $\rho_i(z_0)$ to the phase difference calculating unit 23.

The phase difference calculating unit 23 calculates, in each of a plurality of reflected signals present in one pixel in each combination i, a phase difference $\Delta\varphi_i(x,z_0)$ between the phase with respect to the first radio wave receiving point $P_1$ and the phase with respect to the second radio wave receiving point $P_2$ by using the phase shift component $\varphi_i(x)$ and the phase $\rho_i(z_0)$.

The following formula (12) is a formula for calculating the phase difference $\Delta\varphi_i(x,z_0)$ used by the phase difference calculating unit 23.

$$\Delta\phi_i(x,z_0)=\phi_i(x)+\rho_i(z_0) \tag{12}$$

The phase difference calculating unit 23 outputs each phase difference $\Delta\varphi_i(x,z_0)$ to the image processing unit 13.

The rotation amount calculating unit 31 acquires each phase difference $\Delta\varphi_i(x,z_0)$ output from the phase difference calculating unit 23.

The rotation amount calculating unit 31 calculates, for each combination i, each of phase rotation amounts $\exp[j\cdot\Delta\varphi_i(x,z_0)]$ in a plurality of pixels included in the second radar image from each phase difference $\Delta\varphi_i(x,z_0)$.

The rotation amount calculating unit 31 outputs each rotation amount $\exp[j\cdot\Delta\varphi_i(x,z_0)]$ to the phase rotating unit 33.

The phase rotating unit 33 acquires the second radar image included in the combination i from the radar image group 2 output from the radar image acquiring unit 11.

The phase rotating unit 33 performs the process of rotating the phases in the pixels included in the acquired second radar image on the basis of the respective rotation amounts $\exp[j\cdot\Delta\varphi_i(x,z_0)]$ output from the rotation amount calculating unit 31.

The following formula (13) is a formula representing the process of rotating a phase performed by the phase rotating unit 33.

$$S_2'(\text{pixel},\text{line})=S_2(\text{pixel},\text{line})\exp[j\Delta\phi_i(x,z_0)] \tag{13}$$

The phase rotating unit 33 outputs a second radar image including a plurality of pixels obtained by phase rotation to the difference calculation processing unit 34.

The difference calculation processing unit 34 acquires the first radar image included in the combination i from the radar image group 2 output from the radar image acquiring unit 11, and acquires the second radar image including a plurality of pixels obtained by the phase rotation and output from the phase rotating unit 33.

The difference calculation processing unit 34 calculates the difference $\Delta S_i(\text{pixel},\text{line})$ between pixel values of pixels at corresponding pixel positions among a plurality of pixels included in the acquired first radar image and among a plurality of pixels obtained by phase rotation included in the acquired second radar image.

The following formula (14) is a formula for calculating the difference $\Delta S_i(\text{pixel},\text{line})$ used by the difference calculation processing unit 34.

$$\Delta S_i(\text{pixel},\text{line})=S_1(\text{pixel},\text{line})-S_2'(\text{pixel},\text{line}) \tag{14}$$

The difference calculation processing unit 34 outputs each difference $\Delta S_i$(pixel,line) to the image combining unit 35.

The rotation amount calculating unit 31, the phase rotating unit 33, and the difference calculation processing unit 34 repeat the process of calculating the difference $\Delta S_i$(pixel, line) until the process of calculating the difference $\Delta S_i$(pixel, line) is completed for all of the combinations i of two radar images.

The image combining unit 35 acquires a weight parameter $w_i$ used for generation of a suppressed image.

The weight parameter $w_i$ may be provided to the image combining unit 35 by manual operation made by a user, or may be provided to the image combining unit 35 from an external device, which is not illustrated.

The image combining unit 35 combines differences $\Delta S_i$(pixel,line) at corresponding pixel positions among the respective differences calculated for the respective combinations i by the difference calculation processing unit 34 by using the weight parameter $w_i$.

The image combining unit 35 outputs a suppressed image including the respective differences $S_{sup}$(pixel,line) resulting from the combining to the outside of the unit.

For the method of combining the differences $\Delta S_i$(pixel, line) in all the combination, a method of obtaining an arithmetic mean or a method of obtaining a geometric mean can be used.

In a case where the method of obtaining an arithmetic mean is used, the image combining unit 35 combines the differences $\Delta S_i$(pixel,line) in all the combinations by the following formula (15).

$$S_{sup}(\text{pixel, line}) = \frac{1}{N} \sum_i^N w_i \Delta S_i(\text{pixel, line}) \tag{15}$$

In a case where the method of obtaining a geometric mean is used, the image combining unit 35 combines the differences $\Delta S_i$(pixel,line) in all the combinations by the following formula (16).

$$S_{sup}(\text{pixel, line}) = \left\{ \prod_i^N \Delta S_i (\text{pixel, line})^{w_i} \right\}^{1/N} \tag{16}$$

In the formulas (15) and (16), N represents the number of combinations of two radar images.

Figure 14:
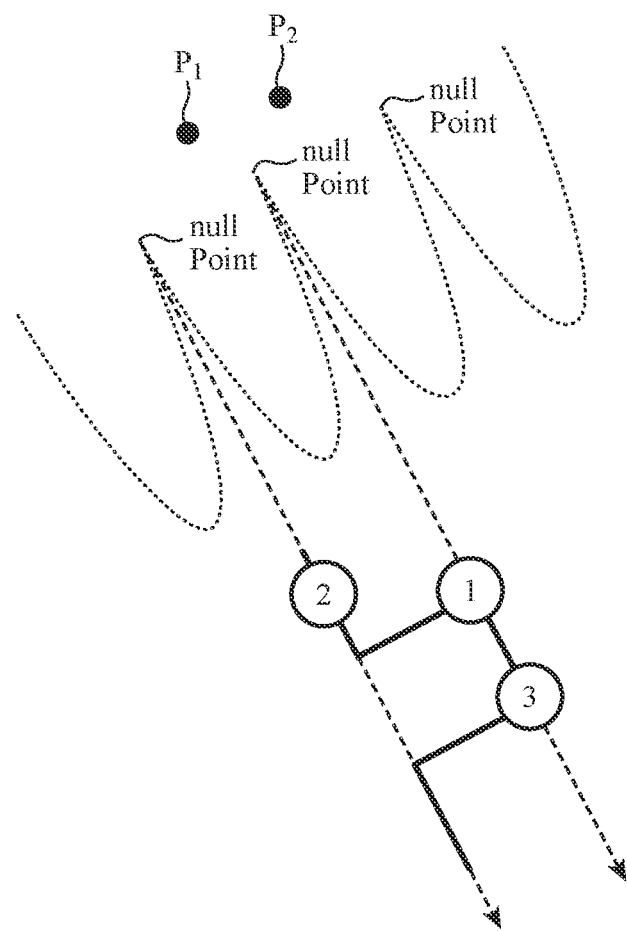
FIG. 14 is an explanatory diagram illustrating a plurality of reflected signals present in one pixel in a case where only two radar images are included in a radar image group 2.

Here, FIG. 14 is an explanatory diagram illustrating a plurality of reflected signals present in one pixel in a case where only two radar images are included in the radar image group 2 like the radar image processing device 10 of the first embodiment.

In the case where only two radar images are included in the radar image group 2, a plurality of null points may be formed as a result of the process of calculating the differences $\Delta S_i$(pixel,line) performed by the difference calculation processing unit 34 as illustrated in FIG. 14.

In the example of FIG. 14, null points are formed in all of a reflected signal assigned with "1", a reflected signal assigned with "2", and a reflected signal assigned with "3".

Thus, in the example of FIG. 14, all of the reflected signal assigned with "1", the reflected signal assigned with "2", and the reflected signal assigned with "3" are suppressed.

Figure 15:
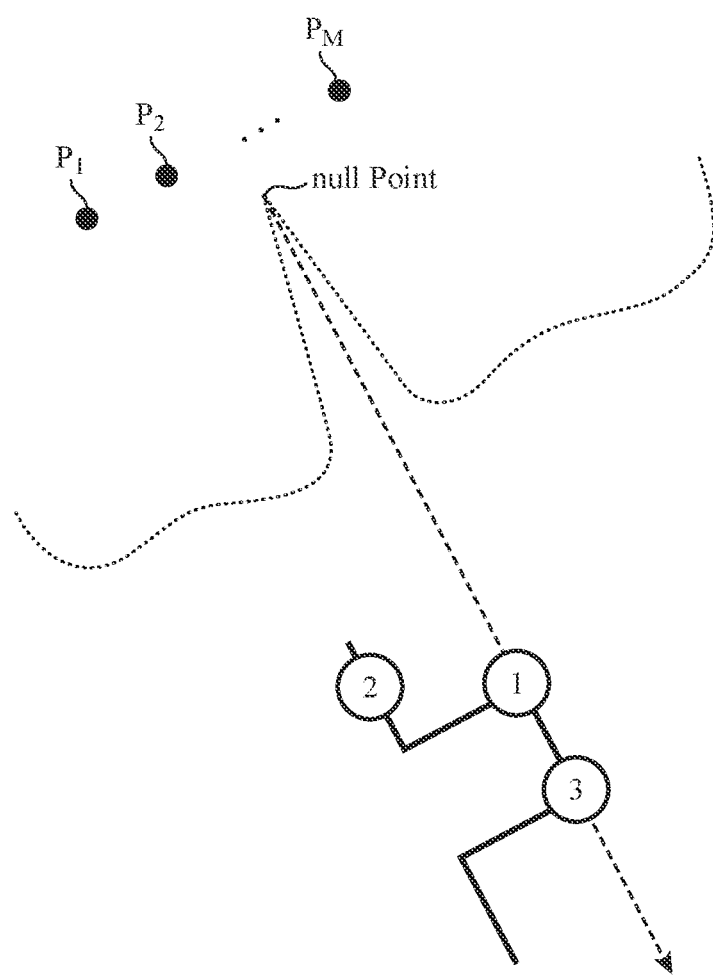
FIG. 15 is an explanatory diagram illustrating a plurality of reflected signals present in one pixel in a case where two or more radar images are included in a radar image group 2.

FIG. 15 is an explanatory diagram illustrating a plurality of reflected signals present in one pixel in a case where two or more radar images are included in the radar image group 2 like the radar image processing device 10 of the second embodiment.

In FIG. 15, the number of radar images included in the radar image group 2 is M, and $P_M$ represents the position of the platform when an M-th radar image is taken.

Because the number of radar images included in the radar image group 2 is two or larger and the image combining unit 35 combines the differences $\Delta S_i$(pixel,line) at corresponding pixel positions, the number of null points that are formed is reduced as compared with that in the case where the number of radar images is two.

In the example of FIG. 15, the number of null points that are formed is one, and no null point is formed in the reflected signal assigned with "2".

In the second embodiment described above, the radar image processing device 10 has a configuration including the image combining unit 35 that combines differences $\Delta S_i$(pixel,line) at corresponding pixel positions among the respective differences calculated for the respective combinations i by the difference calculation processing unit 34. The radar image processing device 10 is therefore capable of reducing the number of null points that are formed, which can prevent reflected signals that need to be maintained from being suppressed.

Third Embodiment

The second embodiment presents an example in which the radar image processing device 10 outputs the differences $S_{sup}$(pixel,line) obtained by the combining as a suppressed image.

In a third embodiment, a radar image processing device 10 that calculates an image in which a plurality of reflected signals present in one pixel are extracted on the basis of the differences $S_{sup}$(pixel,line) resulting from the combining by the image combining unit 35 will be described.

The radar image processing device 10 in the third embodiment has a configuration as illustrated in FIG. 1, that is similar to the radar image processing device 10 of the first or second embodiment.

The phase processing unit 12 in the third embodiment has a configuration as illustrated in FIG. 2, that is similar to the phase processing unit 12 of the first or second embodiment.

Note that the radar image group 2 includes two or more radar images, and the imaging parameter group 3 includes two or more imaging parameters.

Figure 16:
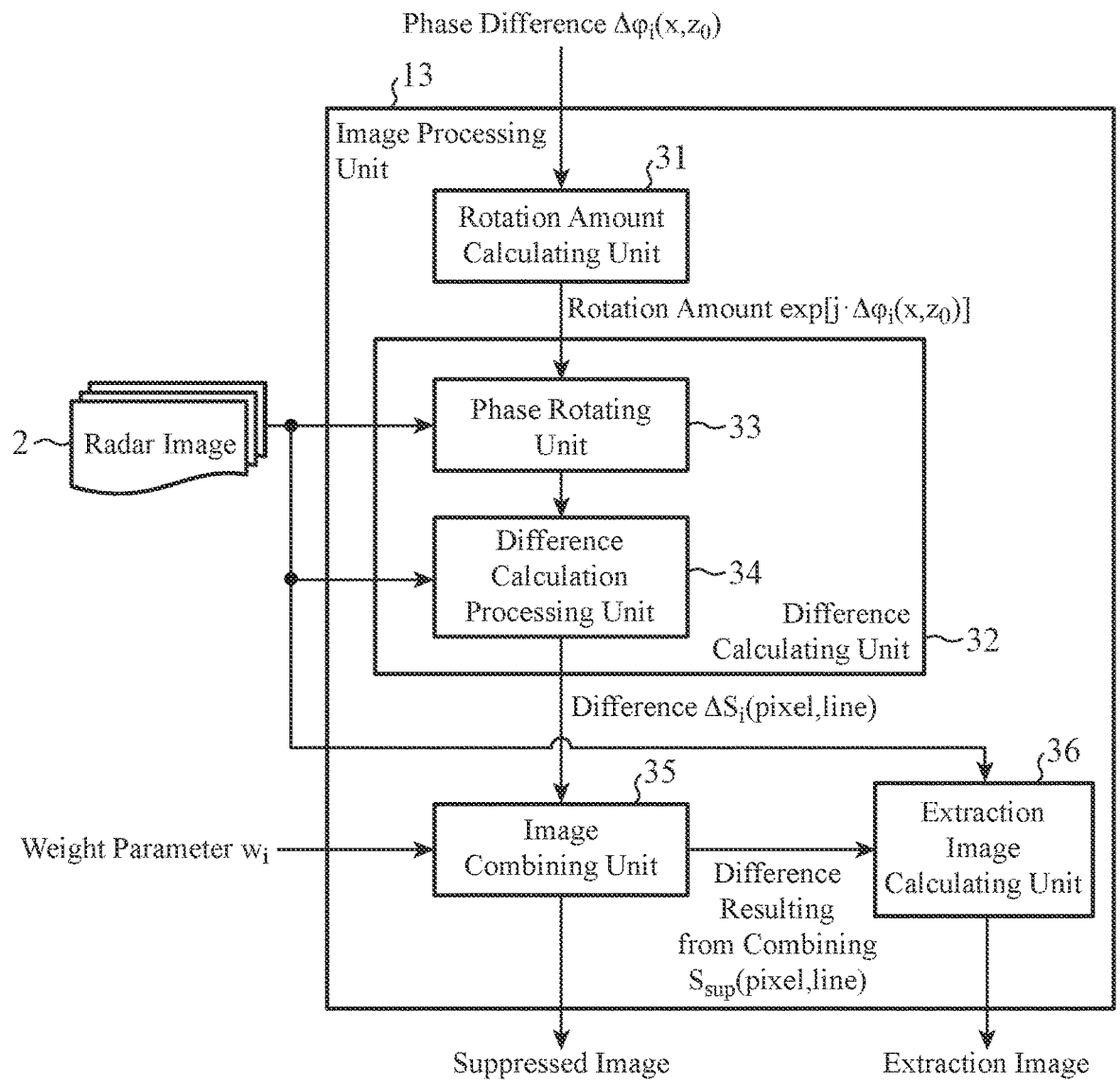
FIG. 16 is a configuration diagram illustrating an image processing unit 13 of a radar image processing device 10 according to a third embodiment.

FIG. 16 is a configuration diagram illustrating an image processing unit 13 of the radar image processing device 10 according to the third embodiment.

Figure 17:
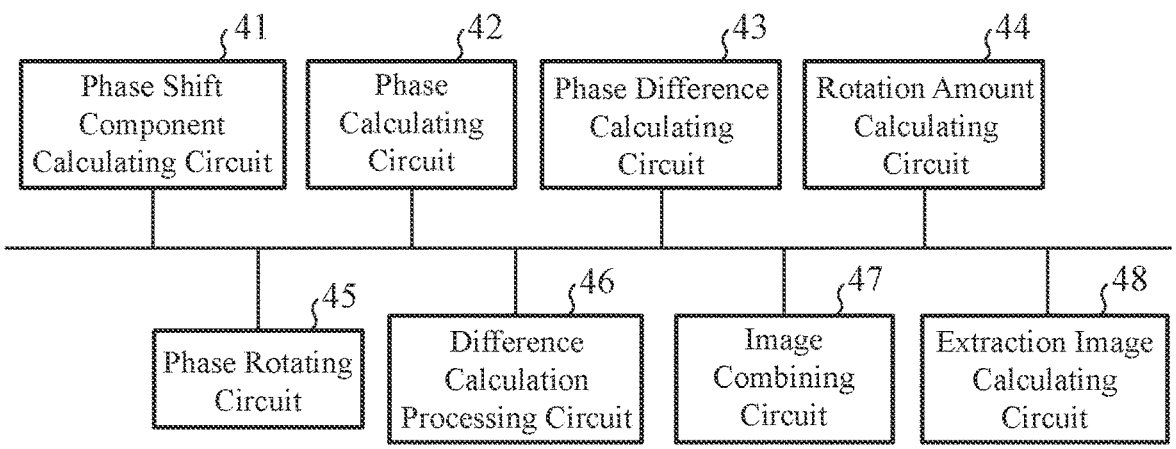
FIG. 17 is a hardware configuration diagram illustrating hardware of each of a phase processing unit 12 and the image processing unit 13.

FIG. 17 is a hardware configuration diagram illustrating hardware of each of the phase processing unit 12 and the image processing unit 13.

In FIGS. 16 and 17, reference numerals that are the same as those in FIGS. 3, 4, 12, and 13 represent the same or corresponding components, and the description thereof will thus not be repeated.

An extraction image calculating unit 36 is implemented by an extraction image calculating circuit 48 illustrated in FIG. 17, for example.

The extraction image calculating unit 36 acquires the first radar image from the radar image group 2 output from the radar image acquiring unit 11, and acquires the respective differences $S_{sup}$(pixel,line) resulting from the combining output from the image combining unit 35.

The extraction image calculating unit 36 performs a process of calculating an image in which a plurality of reflected signals present in one pixel are extracted on the basis of the pixel values of a plurality of pixels included in the first radar image and the respective differences $S_{sup}$(pixel,line) resulting from the combining.

In FIG. 2, it is assumed that each of the phase shift component calculating unit 21, the phase calculating unit 22, and the phase difference calculating unit 23, which are components of the phase processing unit 12, is implemented by such dedicated hardware as illustrated in FIG. 17.

In addition, in FIG. 16, it is assumed that each of the rotation amount calculating unit 31, the phase rotating unit 33, the difference calculation processing unit 34, the image combining unit 35, and the extraction image calculating unit 36, which are components of the image processing unit 13, is implemented by such dedicated hardware as illustrated in FIG. 17.

Specifically, the phase processing unit 12 and the image processing unit 13 are assumed to be implemented by the phase shift component calculating circuit 41, the phase calculating circuit 42, the phase difference calculating circuit 43, the rotation amount calculating circuit 44, the phase rotating circuit 45, the difference calculation processing circuit 46, the image combining circuit 47, and the extraction image calculating circuit 48.

The components of the phase processing unit 12 and the components of the image processing unit 13 are not limited to those implemented by dedicated hardware. The phase processing unit 12 and the image processing unit 13 may be implemented by software, firmware, or a combination of software and firmware.

Next, the operation of the radar image processing device 10 will be explained.

Note that the radar image processing device 10 is similar to the radar image processing device 10 of the second embodiment except that the extraction image calculating unit 36 is included, and thus, only the operation of the extraction image calculating unit 36 will be explained here.

The extraction image calculating unit 36 acquires the first radar image from the radar image group 2 output from the radar image acquiring unit 11, and acquires the respective differences $S_{sup}$(pixel,line) resulting from the combining output from the image combining unit 35.

The extraction image calculating unit 36 calculates a pixel value $S_{ext}$(pixel,line) of a pixel in which a plurality of reflected signals are present from the pixel values of a plurality of pixels included in the first radar image and the respective differences $S_{sup}$(pixel,line) resulting from the combining.

The following formula (17) is a formula for calculating the pixel value $S_{ext}$(pixel,line) used by the extraction image calculating unit 36.

$$S_{ext}(\text{pixel,line})=S_1(\text{pixel,line})/S_{sup}(\text{pixel,line}) \quad (17)$$

The extraction image calculating unit 36 outputs, to the outside of the unit, an image including the pixel having the pixel value $S_{ext}$(pixel,line) as an image in which a plurality of reflected signals present in one pixel are extracted.

In the third embodiment described above, the radar image processing device 10 has a configuration including the extraction image calculating unit 36 that calculates an image in which a plurality of reflected signals present in one pixel are extracted on the basis of the pixel values of a plurality of pixels included in the first radar image and the respective differences $S_{sup}$(pixel,line) resulting from the combining. The radar image processing device 10 is therefore capable of outputting not only a suppressed image in which reflected signals are suppressed but also an extraction image in which reflected signals are extracted.

Fourth Embodiment

In a fourth embodiment, a radar image processing device that receives specification of a first suppression range, which is a suppression range of reflected signals in a first radar image, and a second suppression range, which is a suppression range of reflected signals in a second radar image, will be described.

Figure 18:
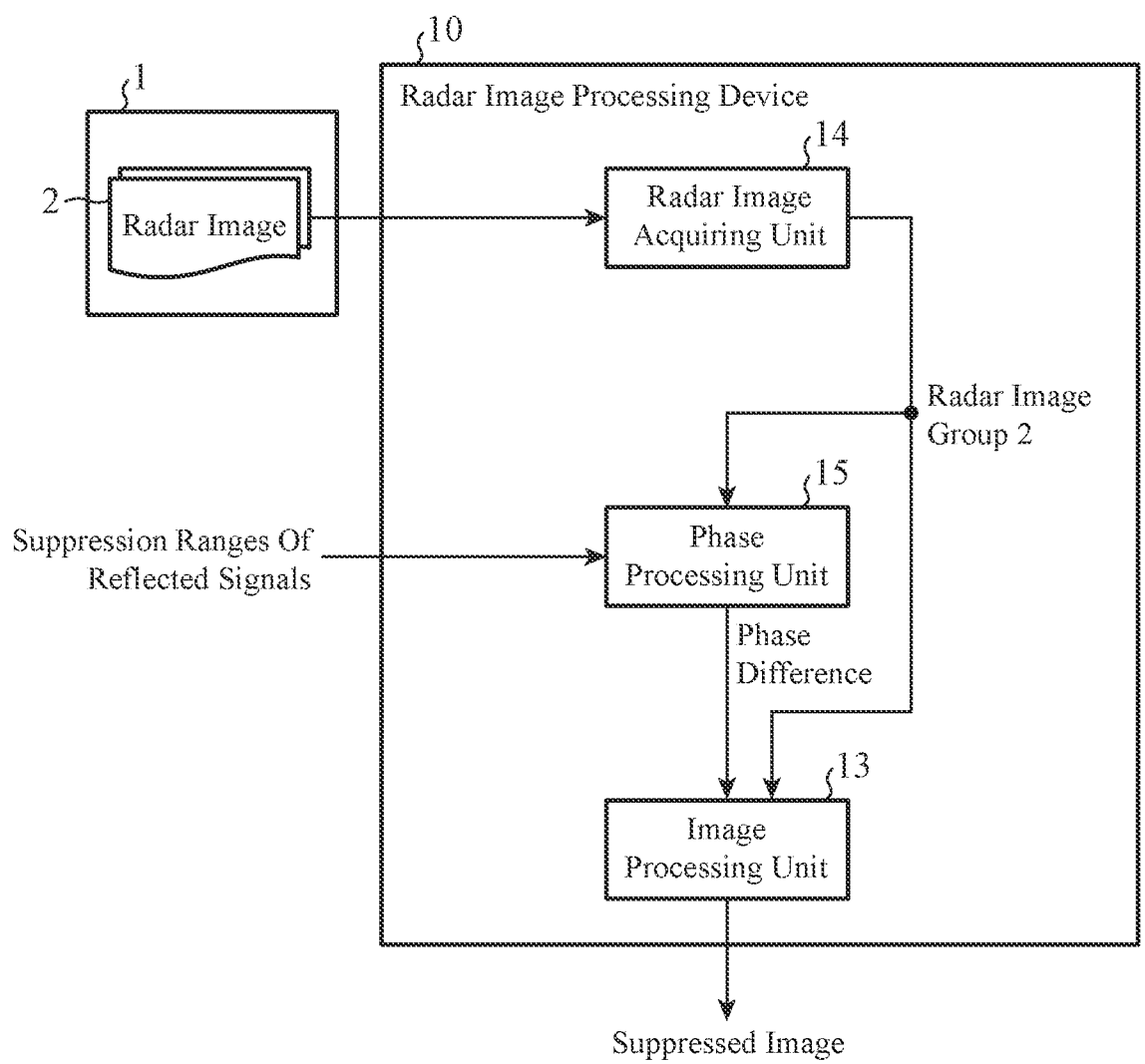
FIG. 18 is a configuration diagram illustrating a radar image processing device 10 according to a fourth embodiment.

FIG. 18 is a configuration diagram illustrating a radar image processing device 10 according to the fourth embodiment. In FIG. 18, reference numerals that are the same as those in FIG. 1 represent the same or corresponding components.

The radar image processing device 10 includes a radar image acquiring unit 14, a phase processing unit 15, and an image processing unit 13.

The radar image acquiring unit 14 acquires a radar image group 2 transmitted from the radar 1. The radar image group 2 includes a first radar image and a second radar image.

The radar image acquiring unit 14 outputs the acquired radar image group 2 to each of the phase processing unit 15 and the image processing unit 13.

The phase processing unit 15 includes a range specification receiving unit 70, and a phase difference calculating unit 71.

The phase processing unit 15 receives specification of a suppression range of reflected signals in the first radar image as the first suppression range, and receives specification of a suppression range of reflected signals in the second radar image as the second suppression range.

The phase processing unit 15 calculates, in each of a plurality of reflected signals present in each of pixels at corresponding pixel positions among a plurality of pixels included in the first suppression range and among a plurality of pixels included in the second suppression range, a phase difference $\Delta\varphi$ between the phase with respect to the first radio wave receiving point and the phase with respect to the second radio wave receiving point.

The phase processing unit 15 outputs the calculated phase difference $\Delta\varphi$ as the phase difference $\Delta\varphi(x,z_0)$ to the image processing unit 13.

The image processing unit 13 illustrated in FIG. 18 calculates a difference between pixel values of pixels at corresponding pixel positions in a manner similar to the image processing unit 13 illustrated in FIG. 1.

Unlike the image processing unit 13 illustrated in FIG. 1, however, the image processing unit 13 illustrated in FIG. 18 calculates each of phase rotation amounts in the pixels included in the second suppression range.

In addition, the image processing unit 13 illustrated in FIG. 18 rotates the phases in the pixels included in the second suppression range, and calculates a difference between pixel values of pixels at corresponding pixel positions among the pixels included in the first suppression range and the pixels obtained by phase rotation included in the second suppression range.

Figure 19:
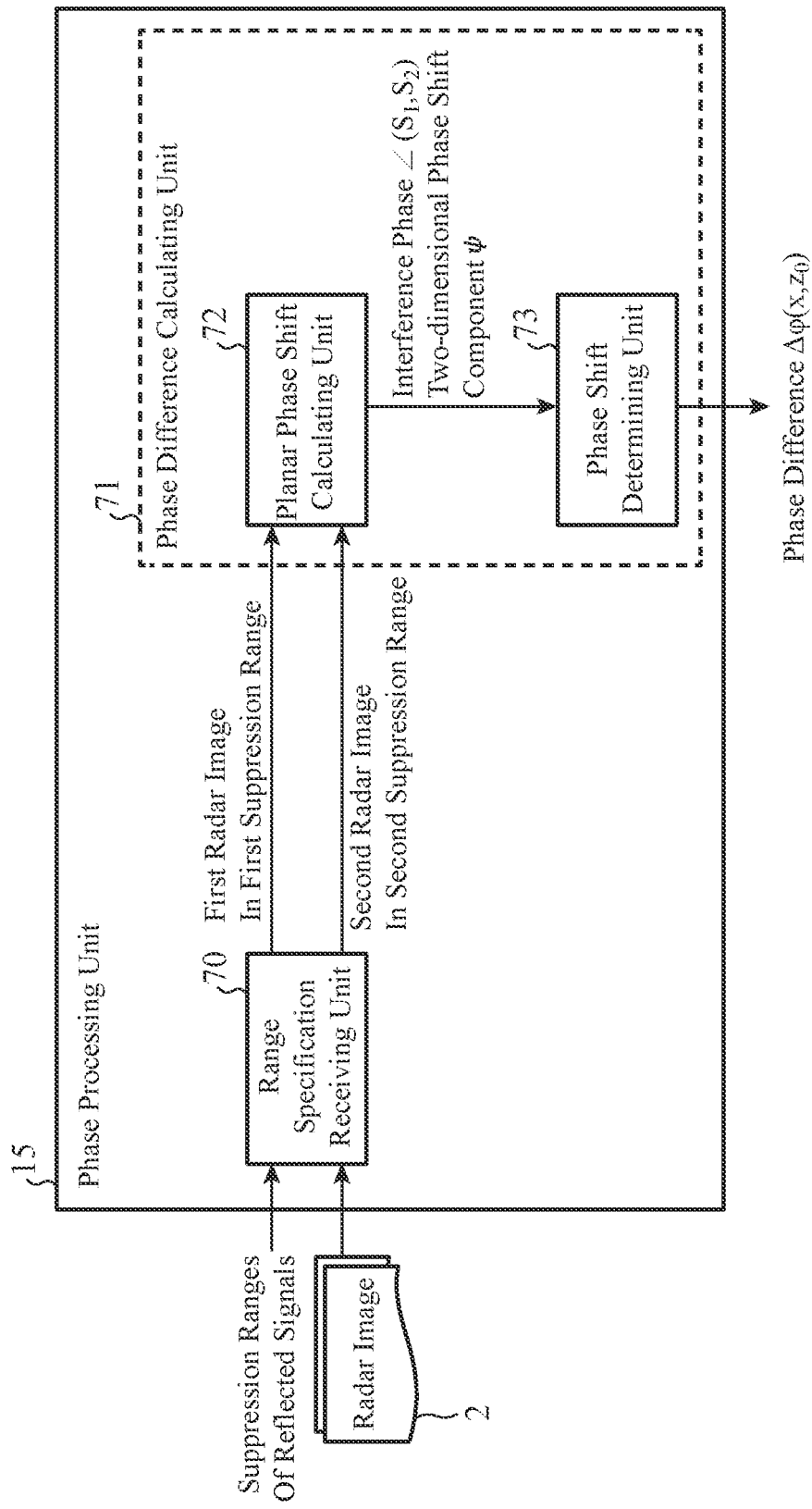
FIG. 19 is a configuration diagram illustrating a phase processing unit 15 of the radar image processing device 10 according to the fourth embodiment.

FIG. 19 is a configuration diagram illustrating the phase processing unit 15 of the radar image processing device 10 according to the fourth embodiment.

Figure 20:
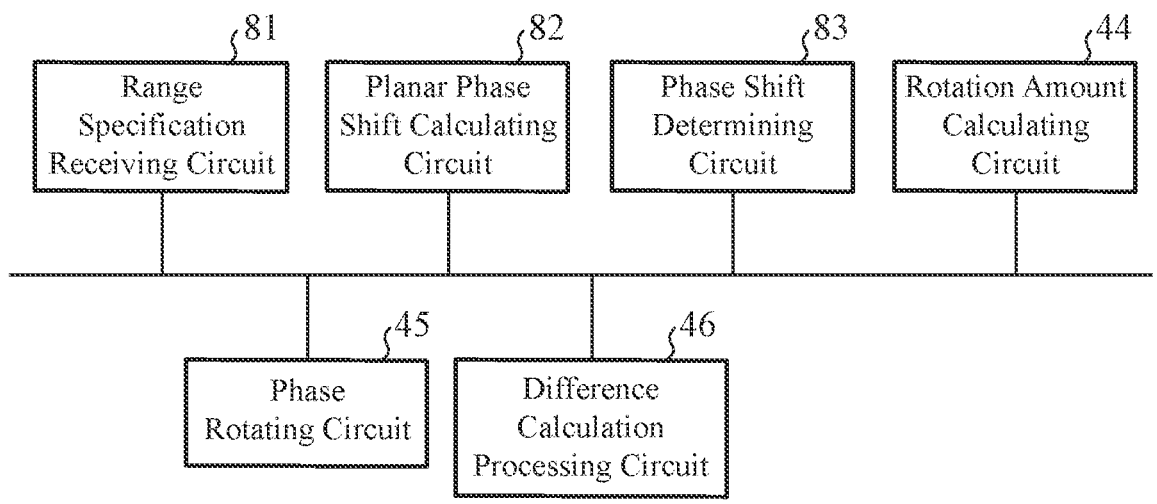
FIG. 20 is a hardware configuration diagram illustrating hardware of each of the phase processing unit 15 and an image processing unit 13.

FIG. 20 is a hardware configuration diagram illustrating hardware of each of the phase processing unit 15 and the image processing unit 13. In FIG. 20, reference numerals that are the same as those in FIG. 4 represent the same or corresponding components.

In FIG. 19, the range specification receiving unit 70 is implemented by a range specification receiving circuit 81 illustrated in FIG. 20, for example.

The range specification receiving unit 70 acquires the radar image group 2 output from the radar image acquiring unit 14.

The range specification receiving unit 70 receives specification of the first suppression range, and receives specification of the second suppression range.

The range specification receiving unit 70 outputs each of the first radar image in the first suppression range and the second radar image in the second suppression range to the phase difference calculating unit 71.

The phase difference calculating unit 71 includes a planar phase shift calculating unit 72, and a phase shift determining unit 73.

The phase difference calculating unit 71 calculates, in each of a plurality of reflected signals present in each of pixels at corresponding pixel positions among a plurality of pixels included in the first suppression range and among a plurality of pixels included in the second suppression range, a phase difference between the phase with respect to the first radio wave receiving point and the phase with respect to the second radio wave receiving point.

The planar phase shift calculating unit 72 is implemented by a planar phase shift calculating circuit 82 illustrated in FIG. 20, for example.

The planar phase shift calculating unit 72 acquires each of the first radar image in the first suppression range and the second radar image in the second suppression range output from the range specification receiving unit 70.

The planar phase shift calculating unit 72 calculates a two-dimensional phase shift component $\psi$ as a spatial shift $\psi$ of the interference phase of a reflected signal in the first suppression range and a reflected signal in the second suppression range.

The planar phase shift calculating unit 72 calculates the interference phase $\angle(S_1/S_2)$ of the first radar image in the first suppression range and the second radar image in the second suppression range.

The planar phase shift calculating unit 72 outputs each of the calculated two-dimensional phase shift component $\psi$ and interference phase $\angle(S_1/S_2)$ to the phase shift determining unit 73.

The phase shift determining unit 73 is implemented by a phase shift determining circuit 83 illustrated in FIG. 20, for example.

The phase shift determining unit 73 determines a phase difference $\Delta\varphi$ between the phase with respect to the first radio wave receiving point and the phase with respect to the second radio wave receiving point in each of a plurality of reflected signals present in one pixel on the basis of the two-dimensional phase shift component and the interference phase $\angle(S_1/S_2)$ calculated by the planar phase shift calculating unit 72.

The phase shift determining unit 73 outputs the determined phase difference $\Delta\varphi$ as the phase difference $\Delta\varphi(x,z_0)$ to the image processing unit 13.

In FIG. 19, it is assumed that each of the range specification receiving unit 70, the planar phase shift calculating unit 72, and the phase shift determining unit 73, which are components of the phase processing unit 15, is implemented by such dedicated hardware as illustrated in FIG. 20.

In addition, in FIG. 3, it is assumed that each of the rotation amount calculating unit 31, the phase rotating unit 33, and the difference calculation processing unit 34, which are components of the image processing unit 13, is implemented by such dedicated hardware as illustrated in FIG. 20.

Specifically, the phase processing unit 15 and the image processing unit 13 are assumed to be implemented by the range specification receiving circuit 81, the planar phase shift calculating circuit 82, the phase shift determining circuit 83, the rotation amount calculating circuit 44, the phase rotating circuit 45, and the difference calculation processing circuit 46.

Note that each of the range specification receiving circuit 81, the planar phase shift calculating circuit 82, the phase shift determining circuit 83, the rotation amount calculating circuit 44, the phase rotating circuit 45, and the difference calculation processing circuit 46 may be a single circuit, a composite circuit, a programmed processor, a parallel-programmed processor, an ASIC, an FPGA, or a combination thereof, for example.

The components of the phase processing unit 15 and the components of the image processing unit 13 are not limited to those implemented by dedicated hardware. The phase processing unit 15 and the image processing unit 13 may be implemented by software, firmware, or a combination of software and firmware.

In the case where the phase processing unit 15 is implemented by software, firmware, or the like, programs for causing a computer to perform procedures of the range specification receiving unit 70, the planar phase shift calculating unit 72, and the phase shift determining unit 73 are stored in the memory 61 illustrated in FIG. 5.

In addition, in the case where the image processing unit 13 is implemented by software, firmware, or the like, programs for causing a computer to perform procedures of the rotation amount calculating unit 31, the phase rotating unit 33, and the difference calculation processing unit 34 are stored in the memory 61.

The processor 62 of the computer illustrated in FIG. 5 thus executes the programs stored in the memory 61.

Next, the operation of the radar image processing device 10 illustrated in FIG. 19 will be explained.

Note that the configuration other than the radar image acquiring unit 14 and the phase processing unit 15 is similar to that of the radar image processing device 10 illustrated in FIG. 1, and thus, the operation of the radar image acquiring unit 14 and the phase processing unit 15 will be mainly explained here.

The radar image acquiring unit 14 acquires a radar image group 2 transmitted from the radar 1. The radar image group 2 includes a first radar image and a second radar image.

The radar image acquiring unit 14 outputs the acquired radar image group 2 to each of the phase processing unit 15 and the image processing unit 13.

The range specification receiving unit 70 acquires the radar image group 2 output from the radar image acquiring unit 14.

The range specification receiving unit 70 receives specification of the first suppression range, which is a suppression range of reflected signals in the first radar image included in the radar image group 2, and the second suppression range, which is a suppression range of reflected signals in the second radar image included in the radar image group 2.

The range specification receiving unit 70 outputs the first radar image in the first suppression range, the specification of which is received, and the second radar image in the second suppression range, the specification of which is received, to the planar phase shift calculating unit 72.

Figure 21A:
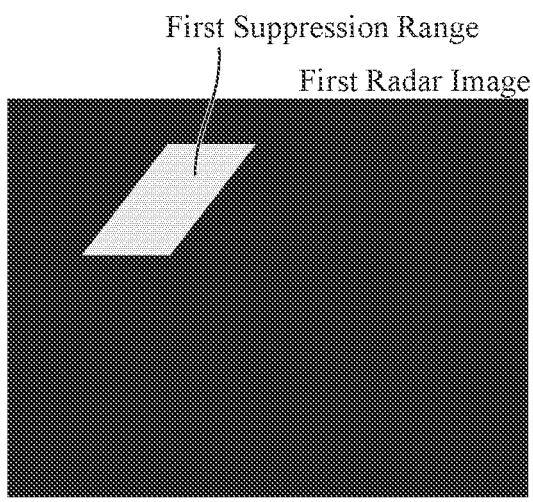
FIG. 21A is an explanatory view illustrating a first suppression range.

When the first suppression range is a parallelogram-shaped region as illustrated in FIG. 21A, for example, a user specifies coordinates of four vertices of the parallelogram-shaped region by using a man-machine interface such as a mouse.

While the first suppression range is a parallelogram-shaped region herein, this is merely an example, and the first suppression range may be a triangular region, a rectangular region, or a pentagonal region, for example.

Upon receiving the coordinate data of the vertices of the region specified by the user by using the man-machine interface, the range specification receiving unit 70 determines the region having vertices indicated by the coordinate data as the first suppression range.

FIG. 21A is an explanatory view illustrating the first suppression range.

Figure 21B:
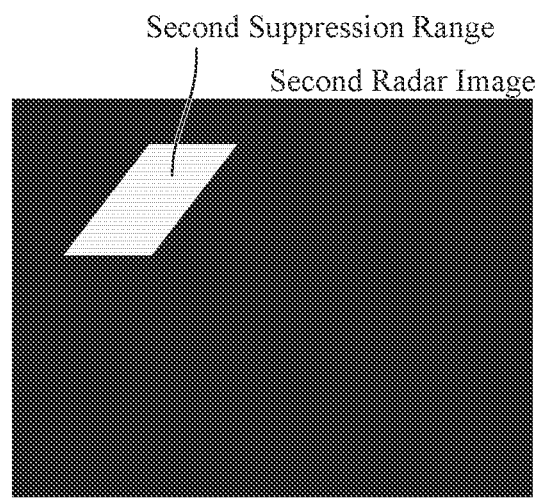
FIG. 21B is an explanatory view illustrating a second suppression range.

When the second suppression range is a parallelogram-shaped region as illustrated in FIG. 21B, for example, a user specifies coordinates of four vertices of the parallelogram-shaped region by using a man-machine interface such as a mouse.

While the second suppression range is a parallelogram-shaped region herein, this is merely an example, and the second suppression range may be a triangular region, a rectangular region, or a pentagonal region, for example.

Upon receiving the coordinate data of the vertices of the region specified by the user by using the man-machine interface, the range specification receiving unit 70 determines the region having vertices indicated by the coordinate data as the second suppression range.

FIG. 21B is an explanatory view illustrating the second suppression range.

In the radar image processing device 10 illustrated in FIG. 19, the range specification receiving unit 70 receives specification of both of the first suppression range and the second suppression range. This is, however, merely an example, and the range specification receiving unit 70 may receive specification of the first suppression range only, and may determine a range at the same position as the first suppression range in the second radar image as the second suppression range.

The planar phase shift calculating unit 72 acquires each of the first radar image in the first suppression range and the second radar image in the second suppression range output from the range specification receiving unit 70.

The planar phase shift calculating unit 72 calculates a two-dimensional phase shift component $\psi$ as a spatial shift $\psi$ of the interference phase of a reflected signal in the first suppression range and a reflected signal in the second suppression range.

The planar phase shift calculating unit 72 outputs the calculated two-dimensional phase shift component $\psi$ to the phase shift determining unit 73.

Hereinafter, a process of calculating the two-dimensional phase shift component $\psi$ performed by the planar phase shift calculating unit 72 will be explained in detail.

The planar phase shift calculating unit 72 acquires the pixel value $S_1$(pixel,line) of a pixel at a pixel position (pixel,line) from a plurality of pixels included in the first suppression range.

The planar phase shift calculating unit 72 acquires the pixel value $S_2$(pixel,line) of a pixel at a pixel position (pixel,line) from a plurality of pixels included in the second suppression range.

The planar phase shift calculating unit 72 calculates $(S_1/S_2)$ as a complex conjugate product $(S_1 \times S^*_2)$ of the pixel value $S_1$(pixel,line) and the pixel value $S_2$(pixel,line). * is a symbol representing a complex conjugate.

The planar phase shift calculating unit 72 calculates $(S_1/S_2)$ as a complex conjugate product $(S_1 \times S^*_2)$ of the pixel value $S_1$(pixel,line) and the pixel value $S_2$(pixel,line) for all the pixels included in the first and second suppression ranges.

The planar phase shift calculating unit 72 applies a two-dimensional Fourier transform to $(S_1/S_2)$ for all the pixels included in the first and second suppression ranges.

The planar phase shift calculating unit 72 extract a two-dimensional phase shift component $\psi$ as a spatial shift $\psi$ of the interference phase from a frequency domain signal resulting from the two-dimensional Fourier transform as expressed by formula (18) below.

The two-dimensional phase shift component t includes an angular frequency $f_{range}\Delta sl$ corresponding to a frequency component $f_{range}$ in a range direction having a peak that is a peak value of frequency components $f_{range}$ in the range direction included in the frequency domain signal.

In addition, the two-dimensional phase shift component t includes an angular frequency $f_{azimuth}\Delta az$ corresponding to a frequency component $f_{azimuth}$ in an azimuth direction having a peak that is a peak value of frequency components $f_{azimuth}$ in the azimuth direction included in the frequency domain signal.

$$\psi=(f_{range}\Delta sl, f_{azimuth}\Delta az) \qquad (18)$$

In the formula (18), $\Delta az$ represents a spacing in the azimuth direction.

The planar phase shift calculating unit 72 calculates the interference phase $\angle(S_1/S_2)$ of the first radar image in the first suppression range and the second radar image in the second suppression range from the frequency component $f_{range}$ in the range direction having a peak and the frequency component $f_{azimuth}$ in the azimuth direction having a peak. $\angle(S_1/S_2)$ represents an argument of $(S/S_2)$. The process itself of calculating the argument of $(S_1/S_2)$ from the frequency component $f_{range}$ in the range direction and the frequency component $f_{azimuth}$ in the azimuth direction is a known technique, and detailed explanation thereof will thus not be provided.

The planar phase shift calculating unit 72 calculates the interference phase $\angle(S_1/S_2)$ for all the pixels included in the first and second suppression ranges.

The planar phase shift calculating unit 72 outputs the interference phases $(S_1/S_2)$ and the two-dimensional phase shift components $\psi$ for all the pixels in the first and second suppression ranges to the phase shift determining unit 73.

The phase shift determining unit 73 calculates $\Delta\psi$ by subtracting the two-dimensional phase shift component $\psi$ from the interference phase $\angle(S_1/S_2)$ as expressed in the following formula (19) for respective pixels at corresponding pixel positions among a plurality of pixels included in the first suppression range and a plurality of pixels included in the second suppression range.

$$\Delta\psi=(S_1/S_2)-\psi \qquad (19)$$

The phase shift determining unit 73 checks whether or not the obtained $\Delta\psi$ is 0, and when the phase difference $\Delta\varphi$ is 0, outputs the two-dimensional phase shift component $\psi$ as the phase difference $\Delta\varphi(x,z_0)$ to the rotation amount calculating unit 31 of the image processing unit 13.

When the obtained $\Delta\psi$ is 0, the interference phase $\angle(S_1/S_2)$ is equal to the two-dimensional phase shift component $\psi$, and the accuracy of calculation of the rotation amount $\exp[j \cdot \Delta\varphi(x,z_0)]$ performed by the rotation amount calculating unit 31 is thus expected to improve.

When the obtained Δψ is not 0, the phase shift determining unit 73 outputs a message for specifying the suppression ranges of reflected signals again to a display, which is not illustrated, for example.

When a user recognizes the message output to the display and specifies the first and second suppression ranges again, the planar phase shift calculating unit 72 re-calculates each of the two-dimensional phase shift component ψ and the interference phase ∠($S_1/S_2$) on the basis of the first and second suppression ranges specified again by the user.

The phase shift determining unit 73 re-calculates Δψ by subtracting the two-dimensional phase shift component ψ from the interference phase ∠($S_1/S_2$) as expressed in the formula (19).

The phase shift determining unit 73 checks whether or not the re-calculated Δψ is 0, and when the phase difference Δφ is 0, outputs the two-dimensional phase shift component ψ as the phase difference Δφ(x,$z_0$) to the rotation amount calculating unit 31 of the image processing unit 13.

When the user does not specify the first and second suppression ranges again even when the message for specifying the suppression ranges of reflected signals again is output to the display, which is not illustrated, the phase shift determining unit 73 may output the two-dimensional phase shift component ψ as the phase difference Δφ(x,$z_0$) to the rotation amount calculating unit 31 of the image processing unit 13.

In the fourth embodiment described above, the radar image processing device 10 has a configuration including the phase difference calculating unit 71 that calculates a phase difference between the phase with respect to the first radio wave receiving point and the phase with respect to the second radio wave receiving point of each of a plurality of reflected signals present in each of pixels at corresponding pixel positions among a plurality of pixels included in the first suppression range and among a plurality of pixels included in the second suppression range, and the rotation amount calculating unit 31 that calculate each of the phase rotation amounts in a plurality of pixels included in the second suppression range from the phase differences calculated by the phase difference calculating unit 71, in which the difference calculating unit 32 rotates the phases in the pixels included in the second suppression range on the basis of the respective rotation amounts calculated by the rotation amount calculating unit 31, and calculates a difference between pixel values of pixels at corresponding pixel positions among the pixels included in the first suppression range and the pixels obtained by the phase rotation included in the second suppression range. The radar image processing device 10 is therefore capable of also suppressing a reflected signal with the phase difference between the phase with respect to the first radio wave receiving point and the phase with respect to the second radio wave receiving point not being zero.

In the radar image processing device 10 illustrated in FIG. 1, the phase processing unit 12 needs to acquire each of the imaging parameters 3, the inclination angle α, and the distance $z_0$ to calculate the phase difference Δφ(x,$z_0$).

In the radar image processing device 10 illustrated in FIG. 18, the phase processing unit 15 need not acquire each of the imaging parameters 3, the inclination angle α, and the distance $z_0$ as long as the phase processing unit 15 can acquire the first and second suppression ranges.

In the radar image processing device 10 illustrated in FIG. 18, the range specification receiving unit 70 determines the first and second suppression ranges from the coordinates of the four vertices of the parallelogram-shaped regions.

Specification of the coordinates of the four vertices by a user corresponds to specification of the frames of the suppression ranges.

The specification of the suppression ranges is not limited to the specification of the frames, and the specification of the first and second suppression ranges may be made by specification of three or more points in the first and second suppression ranges.

Figure 22A:
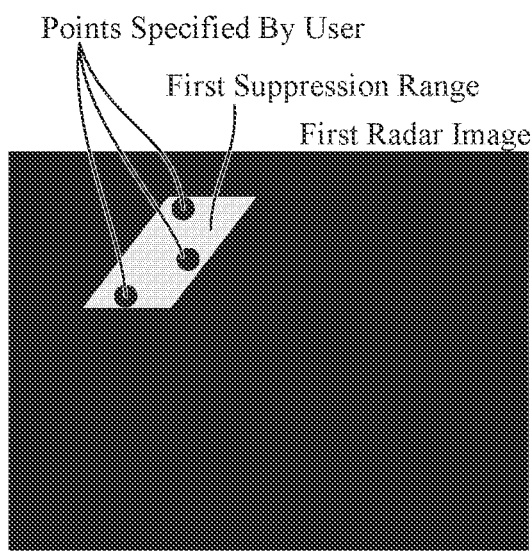
FIG. 22A is an explanatory view illustrating a first suppression range.

When the first suppression range is a parallelogram-shaped region as illustrated in FIG. 22A, for example, a user specifies three or more points in the parallelogram-shaped region by using a man-machine interface such as a mouse.

Upon receiving the coordinate data of the three or more points specified by the user by using the man-machine interface, the range specification receiving unit 70 identifies a two-dimensional plane including the three or more points, and determines the identified two-dimensional plane as the first suppression range.

Regarding the second suppression range, the range specification receiving unit 70 also identifies a two-dimensional plane including the three or more points, and determines the identified two-dimensional plane as the second suppression range in a manner similar to the first suppression range.

Figure 22B:
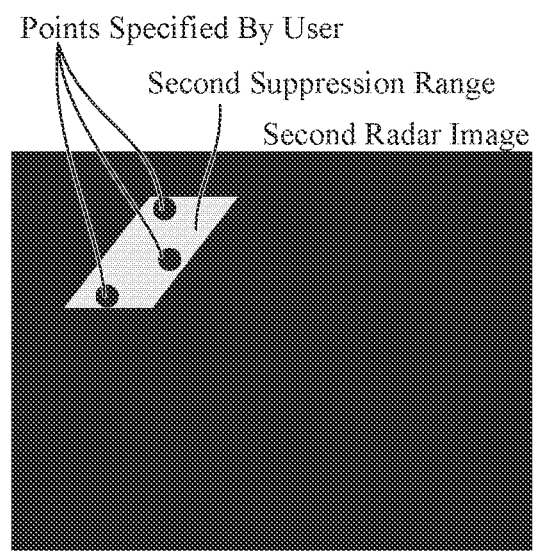
FIG. 22B is an explanatory view illustrating a second suppression range.

FIG. 22A is an explanatory view illustrating the first suppression range, and FIG. 22B is an explanatory view illustrating the second suppression range.

Herein, the range specification receiving unit 70 receives specification of both of the first suppression range and the second suppression range. This is, however, merely an example, and the range specification receiving unit 70 may receive specification of the first suppression range only, and may determine a range at the same position as the first suppression range in the second radar image as the second suppression range.

Note that the embodiments of the present invention can be freely combined, any components in the embodiments can be modified, and any components in the embodiments can be omitted within the scope of the invention.

INDUSTRIAL APPLICABILITY

The present invention is suitable for a radar image processing device and a radar image processing method for calculating differences between a plurality of pixels included in a first radar image and a plurality of pixels obtained by phase rotation included in a second radar image.

REFERENCE SIGNS LIST

1: radar, 2: radar image group, 3: imaging parameter group, 10: radar image processing device, 11, 14: radar image acquiring unit, 12, 15: phase processing unit, 13: image processing unit, 21: phase shift component calculating unit, 22: phase calculating unit, 23: phase difference calculating unit, 31: rotation amount calculating unit, 32: difference calculating unit, 33: phase rotating unit, 34: difference calculation processing unit, 35: image combining unit, 36: extraction image calculating unit, 41: phase shift component calculating circuit, 42: phase calculating circuit, 43: phase difference calculating circuit, 44: rotation amount calculating circuit, 45: phase rotating circuit, 46: difference calculation processing circuit, 47: image combining circuit, 48: extraction image calculating circuit, 51: inclined surface, 52: parallel surface, 61: memory, 62: processor, 70: range specification receiving unit, 71: phase difference calculating unit, 72: planar phase shift calculating unit, 73: phase shift determining unit, 81: range specification receiving circuit, 82: planar phase shift calculating circuit, 83: phase shift determining circuit

The invention claimed is:

1. A radar image processing device comprising:
processing circuitry configured to:
calculate a phase difference between a phase with respect to a first radio wave receiving point and a phase with respect to a second radio wave receiving point of each of a plurality of reflected signals present in each of pixels at corresponding pixel positions among a plurality of pixels included in a first suppression range and among a plurality of pixels included in a second suppression range, the first suppression range being a suppression range of reflected signals in a first radar image capturing an observation area from the first radio wave receiving point, the second suppression range being a suppression range of reflected signals in a second radar image capturing the observation area from the second radio wave receiving point;
calculate each of phase rotation amounts in the pixels included in the second suppression range from each phase difference calculated;
rotate the phases in the pixels included in the second suppression range on a basis of the respective rotation amounts calculated;
suppress unnecessary reflected signals in the first suppression range by calculating a difference between pixel values of pixels at corresponding pixel position among the pixels included in the first suppression range and the pixels obtained by the phase rotation included in the second suppression range; and
output a suppressed image.

2. The radar image processing device according to claim 1, wherein the processing circuitry is further configured to
calculate a spatial shift of an interference phase of a reflected signal in the first suppression range and a reflected signal in the second suppression range, and
calculate the phase difference between the phase with respect to the first radio wave receiving point and the phase with respect to the second radio wave receiving point from the spatial shift of the interference phase.

3. The radar image processing device according to claim 1, wherein the processing circuitry is further configured to receive specification of the first suppression range and the second suppression range, and
output the first suppression range, the specification of which is received, and the second suppression range, the specification of which is received.

4. The radar image processing device according to claim 1, wherein the processing circuitry is further configured to:
receive specification of the first suppression range, and
determine, as the second suppression range, a range in the second radar image at a position corresponding to that of the first suppression range, and
output each of the first suppression range, the specification of which is received, and the determined second suppression range.

5. A radar image processing method comprising:
calculating a phase difference between a phase with respect to a first radio wave receiving point and a phase with respect to a second radio wave receiving point of each of a plurality of reflected signals present in each of pixels at corresponding pixel positions among a plurality of pixels included in a first suppression range and among a plurality of pixels included in a second suppression range, the first suppression range being a suppression range of reflected signals in a first radar image capturing an observation area from the first radio wave receiving point, the second suppression range being a suppression range of reflected signals in a second radar image capturing the observation area from the second radio wave receiving point;
calculating each of phase rotation amounts in the pixels included in the second suppression range from each phase difference calculated;
rotating the phases in the pixels included in the second suppression range on a basis of the respective rotation amounts calculated;
suppressing unnecessary reflected signals in the first suppression range by calculating a difference between pixel values of pixels at corresponding pixel position among the pixels included in the first suppression range and the pixels obtained by the phase rotation included in the second suppression range; and
outputting a suppressed image.

* * * * *